US 9,215,374 B2

(12) United States Patent  
Sakai

(10) Patent No.: US 9,215,374 B2
(45) Date of Patent: Dec. 15, 2015

(54) IMAGE PROCESSING APPARATUS, IMAGE PROCESSING METHOD, AND IMAGING APPARATUS THAT CORRECTS TILT OF AN IMAGE BASED ON AN OPERATION INPUT

(75) Inventor: Yasuo Sakai, Tokyo (JP)

(73) Assignee: Sony Corporation (JP)

( * ) Notice: Subject to any disclaimer, the term of this patent is extended or adjusted under 35 U.S.C. 154(b) by 590 days.

(21) Appl. No.: 12/583,046

(22) Filed: Aug. 13, 2009

(65) Prior Publication Data

US 2010/0039548 A1    Feb. 18, 2010

(30) Foreign Application Priority Data

Aug. 18, 2008 (JP) ................. P2008-210018

(51) Int. Cl.
H04N 5/232 (2006.01)

(52) U.S. Cl.
CPC ....... H04N 5/23293 (2013.01); H04N 5/23216 (2013.01)

(58) Field of Classification Search
CPC .................................. H04N 5/23293
USPC ....... 348/333.12; 345/173; 715/863; 382/289
See application file for complete search history.

(56) References Cited

U.S. PATENT DOCUMENTS

| 5,528,387 | A  | * | 6/1996  | Kelly et al. ............... 358/488 |
| 5,901,253 | A  | * | 5/1999  | Tretter .................... 382/289 |
| 7,327,900 | B2 | * | 2/2008  | Harada et al. ............. 382/289 |
| 7,524,067 | B2 | * | 4/2009  | Sato ....................... 353/42 |
| 7,734,058 | B1 | * | 6/2010  | Adams et al. ............. 382/100 |
| 8,064,729 | B2 | * | 11/2011 | Li et al. .................. 382/289 |
| 8,121,441 | B2 | * | 2/2012  | Minamino ................. 382/321 |
| 8,249,388 | B2 | * | 8/2012  | Xu ......................... 382/282 |
| 8,249,391 | B2 | * | 8/2012  | Curtis .................... 382/289 |
| 8,588,550 | B2 | * | 11/2013 | Liu ........................ 382/289 |
| 8,837,865 | B2 | * | 9/2014  | Konno ..................... 382/296 |
| 2004/0264805 | A1 | * | 12/2004 | Harada et al. ............ 382/282 |
| 2005/0212931 | A1 | * | 9/2005  | Gallagher et al. ........ 348/239 |
| 2005/0251015 | A1 | * | 11/2005 | Takikawa et al. ......... 600/407 |
| 2006/0001650 | A1 | * | 1/2006  | Robbins et al. ........... 345/173 |

(Continued)

FOREIGN PATENT DOCUMENTS

| JP | 09135331 A    | * | 5/1997 | ............. H04N 1/04 |
| JP | 2007028536 A  |   | 2/2007 | |

(Continued)

OTHER PUBLICATIONS

Office Action from Japanese Application No. 2008-210018, dated Jun. 8, 2010.

*Primary Examiner* — Roberto Velez
*Assistant Examiner* — Cynthia Segura
(74) *Attorney, Agent, or Firm* — Lerner, David, Littenberg, Krumholz & Mentlik, LLP

(57) ABSTRACT

There is provided an image processing apparatus including an operation display unit for displaying an image on a display screen and capable of an operation input on the image displayed on the display screen, an operation input detection unit for detecting an operation input in the operation display unit, an approximate straight line derivation unit for deriving first approximate straight line approximately indicating a trajectory of the operation input based on the detection result in the operation input detection unit, and an image correction unit for correcting a tilt of the image displayed on the display screen based on the derived first approximate straight line and a predetermined reference line.

9 Claims, 13 Drawing Sheets

(56) References Cited

U.S. PATENT DOCUMENTS

| | | | |
|---|---|---|---|
| 2006/0189385 A1* | 8/2006 | Nakajima et al. | 463/37 |
| 2007/0274704 A1* | 11/2007 | Nakajima et al. | 396/310 |
| 2008/0144964 A1* | 6/2008 | Soinio et al. | 382/275 |
| 2009/0079700 A1* | 3/2009 | Abernathy | 345/173 |
| 2009/0110328 A1* | 4/2009 | Minamino | 382/289 |
| 2009/0184939 A1* | 7/2009 | Wohlstadter et al. | 345/173 |
| 2009/0207142 A1* | 8/2009 | Keranen | 345/173 |
| 2009/0252437 A1* | 10/2009 | Li et al. | 382/289 |
| 2009/0265670 A1* | 10/2009 | Kim et al. | 715/863 |
| 2009/0300554 A1* | 12/2009 | Kallinen | 715/863 |
| 2010/0031188 A1* | 2/2010 | Liu | 715/801 |
| 2010/0097337 A1* | 4/2010 | Lin et al. | 345/173 |

FOREIGN PATENT DOCUMENTS

| | | |
|---|---|---|
| JP | 2007-173966 A | 7/2007 |
| JP | 2007274720 A | 10/2007 |

\* cited by examiner

IMAGE PROCESSING APPARATUS, IMAGE PROCESSING METHOD, AND IMAGING APPARATUS THAT CORRECTS TILT OF AN IMAGE BASED ON AN OPERATION INPUT

CROSS-REFERENCE TO RELATED APPLICATION

The present application claims priority from Japanese Patent Application No. JP 2008-210018 filed in the Japanese Patent Office on Aug. 18, 2008, the entire content of which is incorporated herein by reference.

BACKGROUND OF THE INVENTION

1. Field of the Invention

The present invention relates to an image processing apparatus, image processing method, program and imaging apparatus.

2. Description of the Related Art

In recent years, there have been widely used apparatuses having an imaging function of imaging still images and/or animations such as digital still camera, digital video camera including Handycam whose trademark the present applicant has, and cell phone having a digital camera function. Moreover, an imaging function is provided in a portable apparatus such as cell phone so that users often perform imaging. Since the user which uses an apparatus like the above to perform imaging is not a professional cameraman, a photographic subject may be imaged to be tilted relative to the horizontal direction due to, for example, camera shake or the like. In the above case, in an image obtained by the imaging, a photographic subject is tilted relative to the horizontal direction of the image.

There has been developed a technique for obtaining a horizontally-maintained photographed image without a tilt sensor for detecting a tilt. For example, there is described in Japanese Unexamined Patent Application Publication No. 2007-173966 a technique for extracting a straight line from a photographic subject within the frame to derive an angle relative to the horizontal direction and correcting a tilt of the image based on the derived angle to obtain a horizontally-maintained photographed image.

SUMMARY OF THE INVENTION

However, an apparatus having an imaging function (referred to as "imaging apparatus" below), to which a technique in related art for obtaining a horizontally-maintained photographed image without a tilt sensor is applied, may not correct a tilt of an image if a photographic subject having a straight line is not present within the frame. In the above case, the imaging apparatus to which the technique in related art is applied may not obtain a horizontally-maintained photographed image. Furthermore, even when a photographic subject having a straight line is present within the frame and a tilt is corrected based on the straight line of the photographic subject, the imaging apparatus to which the technique in related art is applied may not obtain a user-desired photographed image. For example, there is assumed a case in which the imaging apparatus to which the technique in related art is applied corrects a tilt based on an unintended straight line (such as portion originally tilted relative to the horizontal direction). Furthermore, even when the technique in related art for obtaining a horizontally-maintained photographed image without a tilt sensor is applied to an image processing apparatus for processing an image stored in a recording medium such as hard disk or memory stick, the similar issues to the above occur.

Thus, even when the technique in related art for obtaining a horizontally-maintained photographed image without a tilt sensor is used, a tilt relative to the horizontal direction of an image may not be corrected.

In addition, when a tilt sensor is provided in the imaging apparatus, a tilt relative to the horizontal direction of the imaging apparatus is detected by the tilt sensor, thereby obtaining a horizontally-maintained photographed image, but an increase in cost is caused. Furthermore, even when the tilt sensor is provided in the image processing apparatus for processing an image stored in the recording medium, since the tilt sensor may not detect a tilt of the image, the tilt of the image may not be corrected.

The present invention has been made in views of the above issues, and it is desirable to provide a novel and improved image processing apparatus, image processing method, program and imaging apparatus capable of correcting a tilt relative to the horizontal direction of an image based on an operation input.

According to an embodiment of the present invention, there is provided an image processing apparatus including: an operation display unit for displaying an image on a display screen and capable of an operation input on the image displayed on the display screen; an operation input detection unit for detecting an operation input in the operation display unit; an approximate straight line derivation unit for deriving first approximate straight line approximately indicating a trajectory of the operation input based on the detection result in the operation input detection unit; and an image correction unit for correcting a tilt of the image displayed on the display screen based on the derived first approximate straight line and a predetermined reference line.

With such configuration, it is possible to correct a tilt relative to the horizontal direction of the image based on the operation input.

The image correction unit may correct a tilt of the image by assuming that a tilt of the first approximate straight line is the same as a tilt of the reference line.

The image correction unit may further cut out a region contained in the image among regions defined by two first straight lines parallel to the first approximate straight line and two second straight lines orthogonal to the first approximate straight line.

The image correction unit may estimate and complements regions other than the cut-out region from images of the previous and subsequent frames.

The approximate straight line derivation unit may detect predetermined characteristic points from the image displayed on the display screen and further derives one or more approximate straight lines based on the characteristic points, and when second approximate straight line whose difference relative to the tilt of the first approximate straight line is within a predetermined range is present among the approximate straight lines based on the characteristic points, the image correction unit may correct a tilt of the image displayed on the display screen based on the second approximate straight line and the reference line.

When characteristic points for the second approximate straight line are not present within the image displayed on the display screen, the image correction unit may terminate the correction of the tilt of the image.

According to the embodiments of the present invention described above, there is provided an image processing method including the steps of: displaying an image on a display screen and detecting an operation input in an operation display unit capable of the operation input on the image displayed on the display screen; deriving first approximate straight line approximately indicating a trajectory of the operation input based on the detection result in the detection step; and correcting a tilt of the image displayed on the display screen based on the first approximate straight line derived in the derivation step and a predetermined reference line.

With such method, it is possible to correct a tilt relative to the horizontal direction of the image based on the operation input.

According to the embodiments of the present invention described above, there is provided a program for causing a computer to perform the steps of: displaying an image on a display screen and detecting an operation input in an operation display unit capable of the operation input on the image displayed on the display screen; deriving first approximate straight line approximately indicating a trajectory of the operation input based on the detection result in the detection step; and correcting a tilt of the image displayed on the display screen based on the first approximate straight line derived in the derivation step and a predetermined reference line.

With such program, it is possible to correct a tilt relative to the horizontal direction of the image based on the operation input.

According to the embodiments of the present invention described above, there is provided an imaging apparatus including: an imaging unit for imaging a photographic subject and generating a photographed image; an operation display unit for displaying the photographed image imaged by the imaging unit on a display screen and capable of an operation input on the photographed image displayed on the display screen; an operation input detection unit for detecting an operation input in the operation display unit; an approximate straight line derivation unit for deriving first approximate straight line approximately indicating a trajectory of the operation input based on the detection result in the operation input detection unit; an image correction unit for correcting a tilt of the photographed image displayed on the display screen based on the derived first approximate straight line and a predetermined reference line; and an image recording unit for recording a corrected image in a recording medium.

With such configuration, it is possible to correct a tilt relative to the horizontal direction of the image based on the operation input.

According to the embodiments of the present invention described above, it is possible to correct a tilt relative to the horizontal direction of the image based on the operation input.

DETAILED DESCRIPTION OF THE PREFERRED EMBODIMENTS

Figure 1:
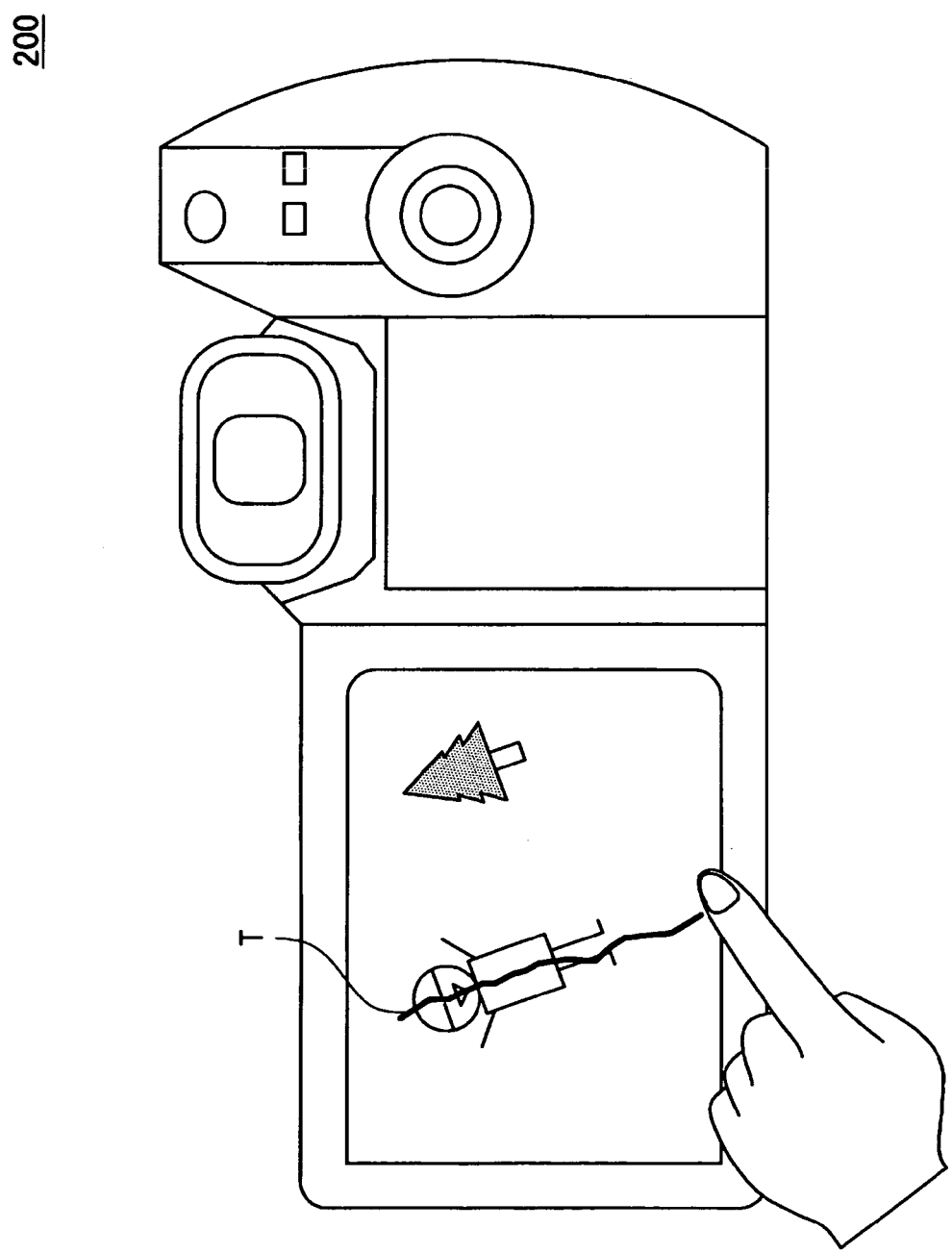
FIG. 1 is an explanatory diagram for explaining an approach of correcting a tilt relative to the horizontal direction of an image according to an embodiment of the present invention.

Hereafter, preferred embodiments of the present invention will be described in detail with reference to the appended drawings. Note that in this specification and the appended drawings, structural elements that have substantially the same functions and configurations are denoted with the same reference numerals and a repeated explanation of these structural elements is omitted.

An image processing apparatus (referred to as "image processing apparatus 100" below) and an imaging apparatus (referred to as "imaging apparatus 200" below) according to an embodiment of the present invention capable of correcting a tilt of an image will be described below. Here, an image according to the embodiment of the present invention may be a still image or animation (so-called video).

In the following, the explanation will be made in the following order:

1. Approach according to the embodiment of the present invention
2. Image processing apparatus according to the embodiment of the present invention
3. Program related to image processing apparatus according to the embodiment of the present invention
4. Imaging apparatus according to the embodiment of the present invention
5. Program related to imaging apparatus according to the embodiment of the present invention (Approach According to the Embodiment of the Present Invention)

An approach of correcting a tilt relative to the horizontal direction of an image according to the embodiment of the present invention will be described first prior to the explanation of configurations of the image processing apparatus 100 and the imaging apparatus 200 according to the embodiment of the present invention.

FIG. 1 is an explanatory diagram for explaining an approach of correcting a tilt relative to the horizontal direction of an image according to the embodiment of the present invention. FIG. 1 shows one example of the imaging apparatus 200. Hereinafter, the approach of correcting a tilt of an image according to the embodiment of the present invention will be described by using the imaging apparatus 200 as an example. The approach of correcting a tilt of an image according to the embodiment of the present invention shown below is also applicable to the image processing apparatus 100.

As shown in FIG. 1, the imaging apparatus 200 displays an image on a display screen. A user of the imaging apparatus 200 performs an operation input (user input) on the image displayed on the display screen and draws a reference trajectory for correcting a tilt. The operation input includes, but is not limited to, a touch (contact) on the display screen, for example. The trajectory for correcting a tilt includes a straight line (which may not be one straight line) as shown in FIG. 1. The trajectory (T shown in FIG. 2) of the operation input is expressed on the display screen in FIG. 1 but is not limited thereto. For example, the imaging apparatus 200 may not express the trajectory of the operation input on the display screen. Then, the imaging apparatus 200 corrects the tilt of the image based on the straight line drawn by the operation input.

More specifically, the imaging apparatus 200 corrects the tilt relative to the horizontal direction of the image through the following processings (1) to (3), for example.

(1) Approximate Straight Line Derivation Processing Based on Trajectory by Operation Input The imaging apparatus 200 derives an approximate straight line based on the trajectory of the operation input as shown in FIG. 1. The imaging apparatus 200 periodically obtains coordinates on the trajectory (which may be referred to as "touch coordinates $(X_n, Y_n)$ hereinafter", where n is a natural number) based on the operation input, and stores the obtained touch coordinates $(X_n, Y_n)$. Then, the imaging apparatus 200 derives an approximate straight line based on a plurality of the stored touch coordinates $(X_n, Y_n)$. The approximate straight line derivation method includes, but is not limited to, the least squares method, for example. Furthermore, the imaging apparatus 200 can derive the touch coordinates $(X_n, Y_n)$ by assuming a certain position on the display screen as the origin (reference point). The origin (reference point) includes, but is not limited to, the lower left corner of the display screen or the center position of the display screen, for example. The approximate straight line derived based on the trajectory of the operation input will be referred to as "first approximate straight line" hereinafter.

(2) Image Tilt Correction Processing

When the first approximate straight line is derived in the processing (1), the imaging apparatus 200 corrects the tilt of the image based on the first approximate straight line and a reference line. The reference line according to the embodiment of the present invention is a reference straight line for correcting a tilt of an image, which is predetermined. The reference line includes a straight line in the vertical direction of the image or a straight line in the horizontal direction of the image, for example.

The image tilt correction method according to the embodiment of the present invention includes, but is not limited to, rotation of image or cut-out of image, for example. For example, when the image is an animation, the imaging apparatus 200 can estimate and complement the cut-out image based on the images corresponding to the previous and subsequent frames of the cut-out image (that is, does not make the user recognize the cut-out image). Furthermore, also when the image is a still image, similarly to when the image is an animation, the imaging apparatus 200 can estimate and complement the cut-out image based on the images corresponding to the previous and subsequent frames (such as images photographed before and after the tilt-corrected image). The examples of uncorrected image and corrected image and a specific example of the processing therefor in the imaging apparatus 200 according to the embodiment of the present invention will be described later.

Figure 2:
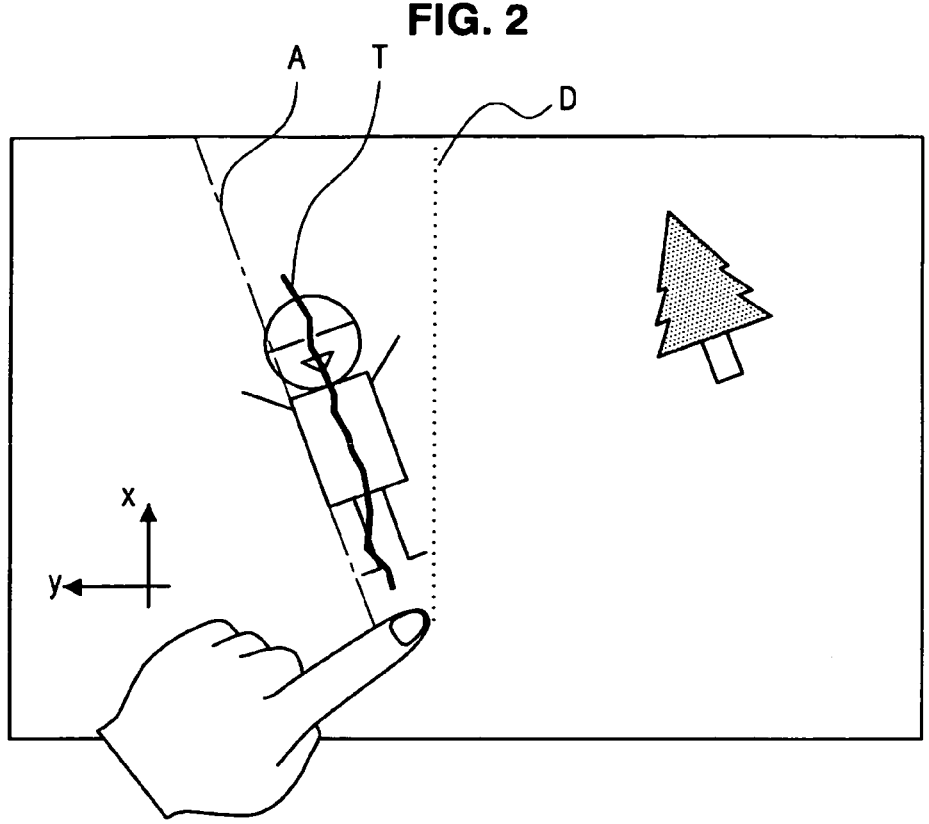
FIG. 2 is an explanatory diagram for explaining first correction processing according to the embodiment of the present invention.

(2-1) First Tilt Correction Processing: When Rotating Image (2-1-1) When Reference Line is Straight Line in Vertical Direction When the reference line is a straight line in the vertical direction, the imaging apparatus 200 rotates the image to correct a tilt such that a tilt of the first approximate straight line is the same as a tilt of the reference line, that is, the first approximate straight line and the reference line are parallel to each other, for example. More specifically, in the imaging apparatus 200, when the first approximate straight line is expressed as $y=ax+b$, the coordinate system is expressed as shown in FIG. 2, for example. As one example, $-\pi/4 < \tan^{-1}(a) < \pi/4$ is assumed as the vertical direction. The imaging apparatus 200 corrects the tilt by rotating the image by "$-\tan^{-1}(a)$", for example.

(2-1-2) When Reference Line is Straight Line in Horizontal Direction

When the reference line is a straight line in the horizontal direction, the imaging apparatus 200 corrects the tilt by rotating the image based on the value of $\tan^{-1}(a)$ corresponding to the tilt a of the first approximate straight line, for example. As one example, $\tan^{-1}(a) \leq -\pi/4$, $\tan^{-1}(a) \geq \pi/4$ are assumed as the horizontal direction. More specifically, when the value of $\tan^{-1}(a)$ corresponding to the tilt a of the first approximate straight line is $\tan^{-1}(a) \leq -\pi/4$, the imaging apparatus 200 rotates the image by "$(-\pi/2)-\tan^{-1}(a)$", for example. Furthermore, in the case of $\tan^{-1}(a) \geq \pi/4$, the imaging apparatus 200 rotates the image by "$\pi/2-\tan^{-1}(a)$", for example.

The center position of the rotation when rotating the image at the tilt correction includes, but is not limited to, the center position of the image, for example. For example, the imaging apparatus 200 can assume a photographic subject (user-designated photographic subject) on the trajectory of the operation input or a moving photographic subject (in the case of animation) within the image as the center position of the rotation. Furthermore, the imaging apparatus 200 can determine the center position of the rotation by displaying the center of rotation on the image and user's selecting the center position of the rotation (such as user's touch operation, or drag&drop operation of the displayed center position).

(2-2) Second Tilt Correction Processing: when Cutting Out Image

The imaging apparatus 200 derives a region defined by two straight lines parallel to the first approximate straight line (the respective straight lines will be referred to as "first straight line" hereinafter) and two straight lines orthogonal to the first approximate straight line (the respective straight lines will be referred to as "second straight line" hereinafter), for example. Then, the imaging apparatus 200 cuts out the region and rotates the cut-out image (the image corresponding to the region) such that the first approximate straight line and the reference line are parallel to each other. The imaging apparatus 200 can cut out a region whose area included in the image is maximum among the region, but the region is not limited to the above. For example, the imaging apparatus 200 can cut out the image which has the same tilt as the tilt of the image and whose size does not exceed the size of the pre-cut out image by the following methods:

1. Rotate and cut out the image such that the center of the image coincides with the center of the corrected image.

2. Rotate and cut out the image such that the position of the trajectory of the operation input (such as user-drawn straight line) coincides with the center of the corrected image.

3. Rotate and cut out the image such that an object (photographic subject) moving near the center of the image is the center of the corrected image (in the case of animation).

4. Rotate and cut out the image such that a person (photographic subject) contained in the image is the center of the corrected image.

5. Determine the center position for correction by displaying the center for correction on the image and user's selecting the center position for correction (by user's touch operation or drag&drop operation of the displayed center position, for example). Cut out the image based on the determined center position for correction.

The imaging apparatus 200 can correct the tilt relative to the horizontal direction of the image based on the first approximate straight line based the operation input as described above and the reference line through the above processings (2-1) and (2-2), for example. Here, since the imaging apparatus 200 derives the first approximate straight line based on the operation input, a photographic subject having a straight line does not need to be present within the frame unlike the technique in related art for obtaining a horizontally-maintained photographed image without the tilt sensor. Furthermore, since the imaging apparatus 200 derives the first approximate straight line based on the operation input, the tilt of the image will not be corrected based on a user-unintended straight line unlike the technique in related art for obtaining a horizontally-maintained photographed image without a tilt sensor. Thus, the imaging apparatus 200 can more accurately correct the tilt relative to the horizontal direction of the image through the above processings (2-1) and (2-2), for example, than the technique in related art.

There has been described that the imaging apparatus 200 derives the approximate straight line to correct the tilt of the image based on the trajectory (straight line) of the operation input as shown in FIG. 1, but the correction of the tilt relative to the horizontal direction of the image according to the embodiment of the present invention is not limited thereto. For example, the imaging apparatus 200 extracts characteristic points from the photographic subject designated by the operation input (such as user's touch operation) and derives the approximate straight line based on the extracted characteristic points, thereby correcting the tilt of the image. Since the imaging apparatus 200 can derive the approximate straight line based on the operation input to correct the tilt of the image also in the above case, the tilt relative to the horizontal direction of the image can be more accurately corrected than the technique in related art.

(3) Following Processing

The imaging apparatus 200 can correct the tilt of the image through the above processing (2). Here, when the image is an animation or when the image displayed on the display screen is switched even in the still image, for example, the contents of the image displayed on the display screen may largely change. In the above case, the correction of the tilt based on the first approximate straight line may not be suitable for the image. On the contrary, if the contents of the image displayed on the display screen do not largely change, even when the correction similar to the correction by the above processing (2) is applied to other image, the tilt relative to the horizontal direction of the image can be corrected. Thus, the imaging apparatus 200 further performs the following processing as the processing corresponding to the above case.

More specifically, the imaging apparatus 200 derives the characteristic points from the photographic subject near the touch coordinates $(Xn, Yn)$ based on the stored touch coordinates $(Xn, Yn)$ based on the operation input. Furthermore, the imaging apparatus 200 derives one or more approximate straight lines based on the derived characteristic points and selects the approximate straight line (referred to as "second approximate straight line" below) whose difference relative to the tilt of the first approximate straight line is within a predetermined range among the approximate straight lines based on the derived characteristic points, for example. The imaging apparatus 200 can also selectively use the characteristic points suitable for the correction to derive the second approximate straight line from among the combinations of the derived characteristic points. When the second approximate straight line is present, the imaging apparatus 200 corrects the tilt of the image similarly to the processing (2) based on the second approximate straight line and the reference line.

The imaging apparatus 200 periodically/non-periodically extracts the characteristic points for the second approximate straight line from the image, and when the characteristic points for the second approximate straight line are present within the image, derives the second approximate straight line based on the characteristic points again. Then, the imaging apparatus 200 repeats the correction based on the second approximate straight line and the reference line and the extraction of the characteristic points for the second approximate straight line. When the characteristic points for the second approximate straight line are not present within the image, the imaging apparatus 200 determines that the contents of the image displayed on the display screen have largely changed, and terminates the correction based on the second approximate straight line and the reference line.

The near photographic subject includes a photographic subject on the touch coordinates $(Xn, Yn)$ or a photographic subject whose characteristic points are within a predetermined distance from the touch coordinates $(Xn, Yn)$. The characteristic points include a straight line of a building (one example of photographic subject) or positions of face, shoulders or legs of a person (one example of photographic subject), for example, but are not limited thereto. For example, the imaging apparatus 200 can use a face detection technique to detect both eyes, nose, mouse or ears of a person (one example of photographic subject) as the characteristic points.

The imaging apparatus 200 can correct the tilt relative to the horizontal direction of the image based on the operation input through the processing (1) (approximate straight line derivation processing based on trajectory by operation input) to the processing (3) (following processing). Hereinafter, a specific example of each processing in the imaging apparatus 200 will be described by way of example of an uncorrected image and a corrected image as needed. As described above, each processing according to the embodiment of the present invention described later is applicable to the image processing apparatus 100.

[Specific Example of Each Processing in the Imaging Apparatus 200]

[1] First Correction Processing: Tilt Correction by Image Rotation

Figure 3:
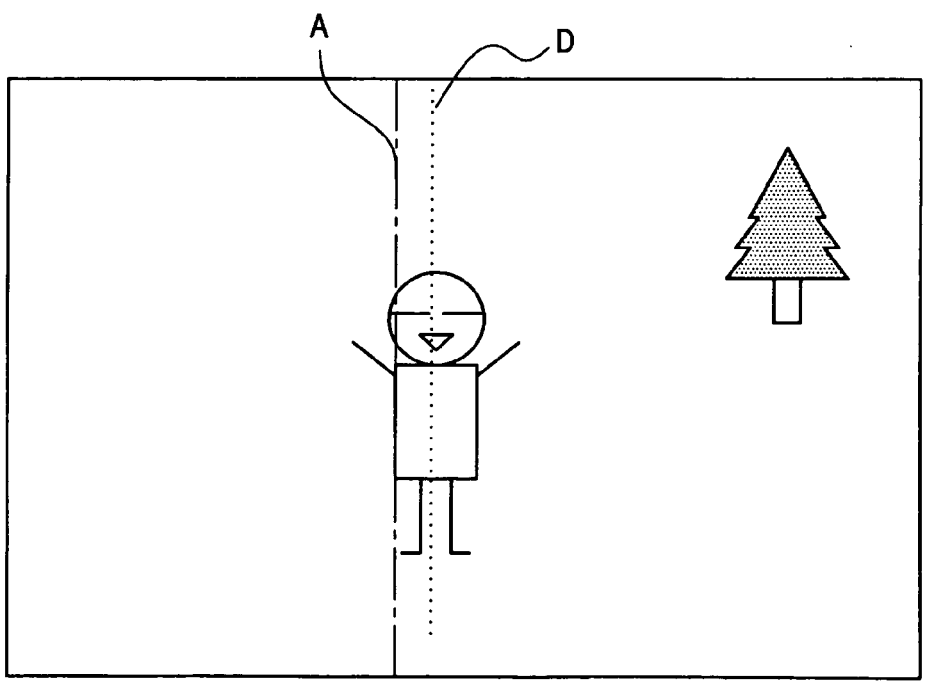
FIG. 3 is an explanatory diagram for explaining first correction processing according to the embodiment of the present invention.

FIGS. 2 and 3 are explanatory diagrams for explaining first correction processing according to the embodiment of the present invention, respectively. FIG. 2 shows one example of an uncorrected image displayed on the display screen, from which it can be seen that the photographic subjects (person and tree) are tilted in the horizontal direction of the image. Furthermore, FIG. 3 shows one example of a corrected image displayed on the display screen, from which it can be seen that the tilt of the image shown in FIG. 2 has been corrected by rotating the image.

As shown in FIG. 2, when the operation input is performed on the display screen, the imaging apparatus 200 derives the first approximate straight line A based on the trajectory T of the operation input. FIG. 2 shows the example in which the first approximate straight line A is horizontally moved from the trajectory T, but the movement is not limited to the example. Furthermore, FIG. 2 shows the reference line D in the vertical direction of the image, but the imaging apparatus 200 may not display the reference line D on the display screen. The imaging apparatus 200 corrects the image by performing the above processing (2-1) based on the first approximate straight line A and the reference line D. Thus, the display screen displays thereon the image whose tilt relative to the horizontal direction has been corrected as shown in FIG. 3. Hereinafter, the first correction processing according to the embodiment of the present invention will be described more specifically.

Figure 4:
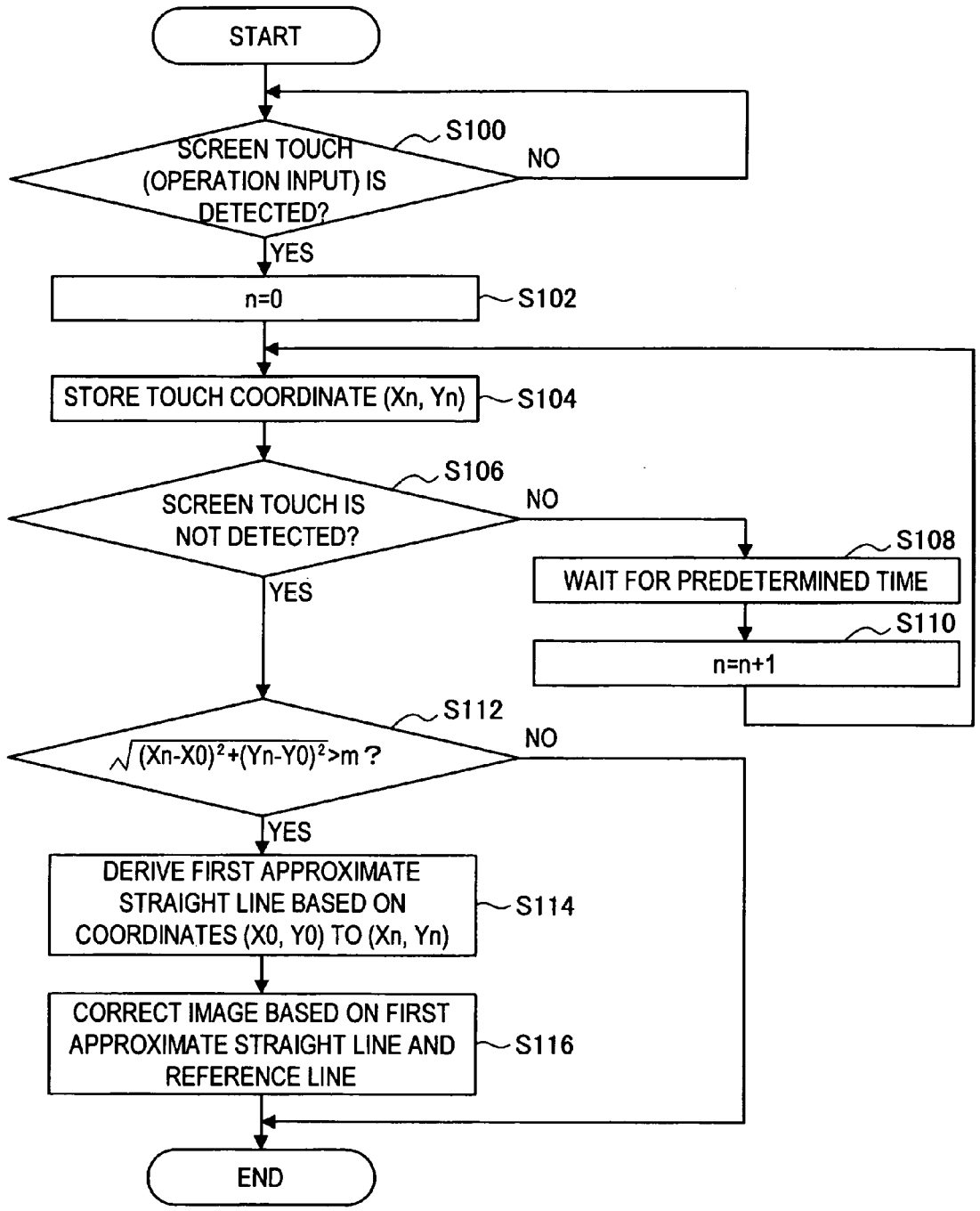
FIG. 4 is a flow diagram showing one example of the first correction processing according to the embodiment of the present invention.

FIG. 4 is a flow diagram showing one example of the first correction processing according to the embodiment of the present invention. Here, FIG. 4 shows one example of the processing of correcting the tilt by rotating the image.

The imaging apparatus 200 determines whether a touch on the display screen (one example of the operation input) has been detected (S100). When the display screen is made of, for example, a touch screen, the imaging apparatus 200 can use various touch screens of resistive film system, optical system, capacitance system or ultrasonic system to make the determination in step S100. When it is not determined in step S100 that the touch on the display screen has been detected, the imaging apparatus 200 may not proceed with the processing until the touch on the display screen is detected.

When it is determined in step S100 that the touch on the display screen has been detected, the imaging apparatus 200 sets n=0 (S102).

Then, the imaging apparatus 200 stores therein the touch coordinate (Xn, Yn) (S104). The imaging apparatus 200 assumes a certain position on the display screen as the origin (reference point), for example, and derives and stores the touch coordinate (Xn, Yn) corresponding to the set n. The origin (reference point) includes the lower left corner of the display screen or the center position of the display screen, for example, but is not limited thereto.

When the touch coordinate (Xn, Yn) is stored in step S104, the imaging apparatus 200 determines whether the touch on the display screen is non yet detected (S106). The imaging apparatus 200 can use various touch screens of resistive film system, optical system, capacitance system or ultrasonic system to make the determination in step S106.

When it is not determined in step S106 that the touch on the display screen is not yet detected, the imaging apparatus 200 waits for a predetermined time (S108) and updates to n=n+1 after the completion of the waiting (S110). Then, the imaging apparatus 200 repeats the processing after step S104.

When it is determined in step S106 that the touch on the display screen is not yet detected, the imaging apparatus 200 determines whether the relationship in the following Formula 1 is met (S112). Here, m (m>0) indicated in Formula 1 is a threshold value for determining whether the trajectory of the operation input meets a predetermined length. The value of m indicated in Formula 1 can be assumed as a predetermined fixed value, for example, but is not limited to, the above value and may be a variable value by the operation input.

$$\sqrt{(Xn-X0)^2+(Yn-Y0)^2} > m \quad \text{[Formula 1]}$$

When it is not determined in step S112 that the relationship in Formula 1 is met, the imaging apparatus 200 terminates the first correction processing. In this manner, the threshold value m is set so that the imaging apparatus 200 can prevent the correction of a user-unintended image due to user's erroneous operation (such as unintended touch on the display screen).

When it is determined in step S112 that the relationship in Formula 1 is met, the imaging apparatus 200 derives the first approximate straight line based on the stored touch coordinates (X0,Y0) to (Xn,Yn) (S114). The imaging apparatus 200 can use the least square method, for example, to derive the first approximate straight line, but the method for deriving the first approximate straight line is not limited to the above method.

When the first approximate straight line is derived in step S114, the imaging apparatus 200 corrects the tilt of the image based on the first approximate straight line and the predetermined reference line (S116). The imaging apparatus 200 can correct the tilt of the image through the above processing (2-1), for example.

The imaging apparatus 200 can perform the processing shown in FIG. 4, for example, to realize the correction of the tilt by rotating the image.

[2] Second Correction Processing: Tilt Correction by Image Cut-Out

Figure 5:
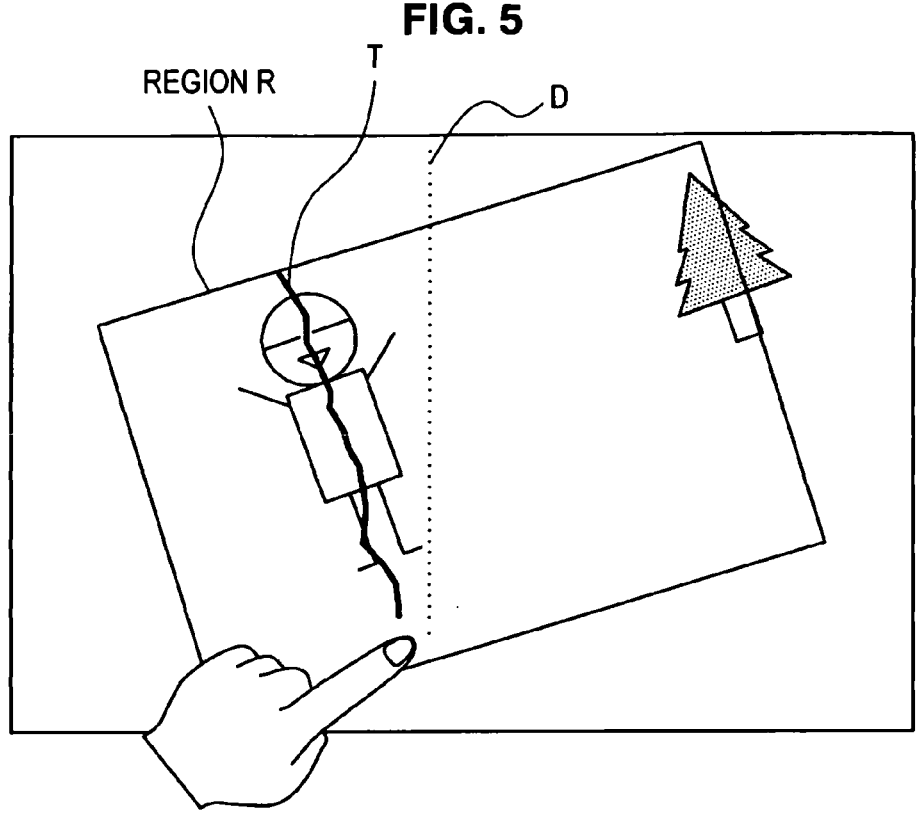
FIG. 5 is an explanatory for explaining second correction processing according to the embodiment of the present invention.
Figure 6:
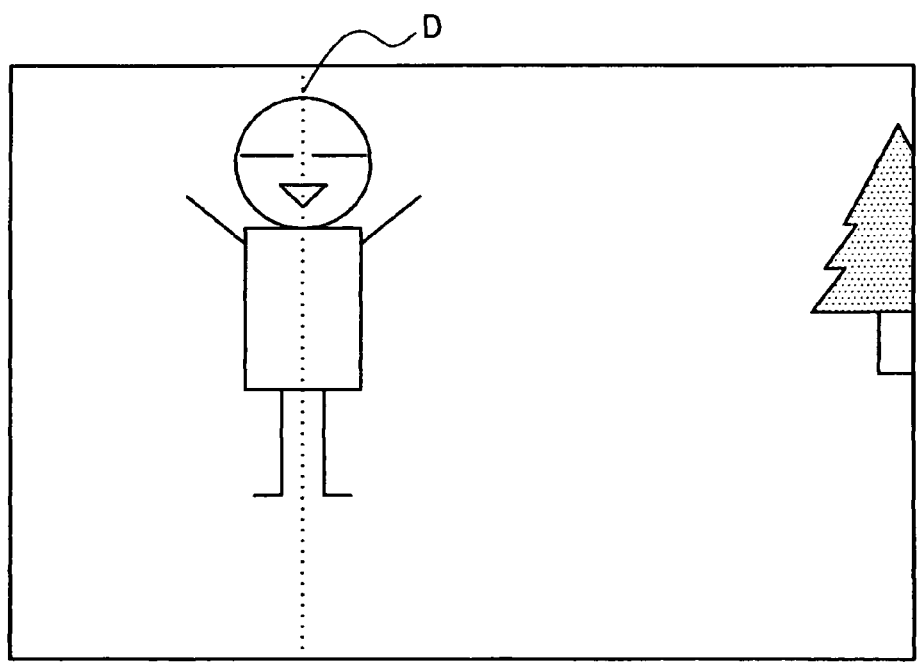
FIG. 6 is an explanatory for explaining second correction processing according to the embodiment of the present invention.

FIGS. 5 and 6 are explanatory diagrams for explaining second correction processing according to the embodiment of the present invention, respectively. FIG. 5 shows one example of an uncorrected image displayed on the display screen, from which it can be seen that the photographic subjects (person and tree) are tilted in the horizontal direction of the image similarly to FIG. 2. FIG. 6 shows one example of a corrected image displayed on the display screen, from which it can be seen that the tilt of the image shown in FIG. 5 has been corrected by cutting out the image.

As shown in FIG. 5, when the operation input is performed on the display screen, the imaging apparatus 200 sets a region R based on the trajectory T of the operation input. The imaging apparatus 200 derives the first approximate straight line A (not shown), for example, and derives first straight line and second straight line based on the derived first approximate straight line A, thereby setting the region R. FIG. 5 shows an example in which the imaging apparatus 200 sets the region R whose area is maximum. FIG. 5 shows the reference line D in the vertical direction of the image, but the imaging apparatus 200 may not display the reference line D on the display screen. The imaging apparatus 200 cuts out the set region R and performs the above processing (2-2) based on the first approximate straight line and the reference line to correct the image. Thus, the display screen displays thereon the image whose tilt relative to the horizontal direction has been corrected by cutting out and rotating the image as shown in FIG. 6. Hereinafter, the second correction processing according to the embodiment of the present invention will be described more specifically.

Figure 7:
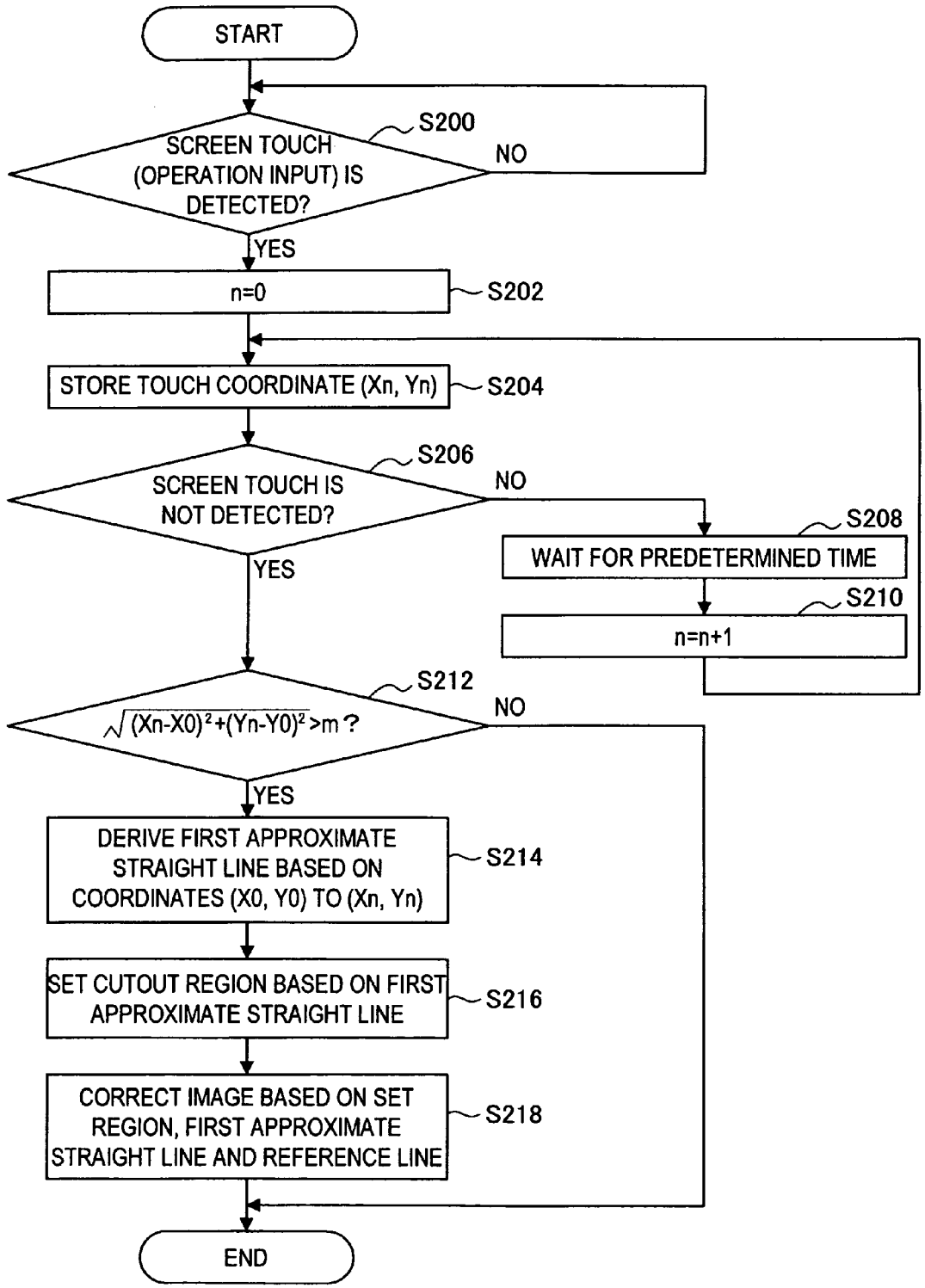
FIG. 7 is a flow diagram showing one example of the second correction processing according to the embodiment of the present invention.

FIG. 7 is a flow diagram showing one example of the second correction processing according to the embodiment of the present invention. FIG. 7 shows one example of the tilt correction processing by cutting out the image.

The imaging apparatus 200 determines whether the touch on the display screen (one example of the operation input) has been detected similarly to step S100 of FIG. 4 (S200). When it is not determined in step S200 that the touch on the display screen has been detected, the imaging apparatus 200 may not proceed with the processing until the touch on the display screen is detected.

When it is determined in step S200 that the touch on the display screen has been detected, the imaging apparatus 200 sets n=0 similarly to step S102 of FIG. 4 (S202). Then, the imaging apparatus 200 stores the touch coordinate (Xn, Yn) similarly to step S104 of FIG. 4 (S204).

When the touch coordinate (Xn, Yn) is stored in step S204, the imaging apparatus 200 determines whether the touch on the display screen is not yet detected similarly to step S106 of FIG. 4 (S206).

When it is not determined in step S206 that the touch on the display screen is not yet detected, the imaging apparatus 200 waits for a predetermined time (S208) and updates to n=n+1 after the completion of the waiting (S210). Then, the imaging apparatus 200 repeats the processing after step S204.

When it is determined in step S206 that the touch on the display screen is not yet detected, the imaging apparatus 200 determines whether the relationship in Formula 1 is met (S212) similarly to step S112 of FIG. 4.

When it is not determined in step S212 that the relationship in Formula 1 is met, the imaging apparatus 200 terminates the second correction processing. In this manner, the threshold value m is set so that the imaging apparatus 200 can prevent the correction of a user-unintended image due to user's erroneous operation similarly to the first correction processing shown in FIG. 4.

When it is determined in step S212 that the relationship in Formula 1 is met, the imaging apparatus 200 derives the first approximate straight line based on the stored touch coordinates (X0, Y0) to (Xn, Yn) similarly to step S114 of FIG. 4.

When the first approximate straight line is derived in step S214, the imaging apparatus 200 sets a region to be cut out based on the first approximate straight line (S216). The imaging apparatus 200 can set the region to be cut out through the above processing (2-2), for example.

When the region to be cut out is set in step S216, the imaging apparatus 200 corrects the tilt of the image based on the set region, the first approximate straight line and the reference line (S218). The imaging apparatus 200 can correct the tilt of the image through the above processing (2-2), for example.

The imaging apparatus 200 can correct the tilt of the cut-out image through the processing shown in FIG. 7, for example.

[3] Following Processing

Figure 8:
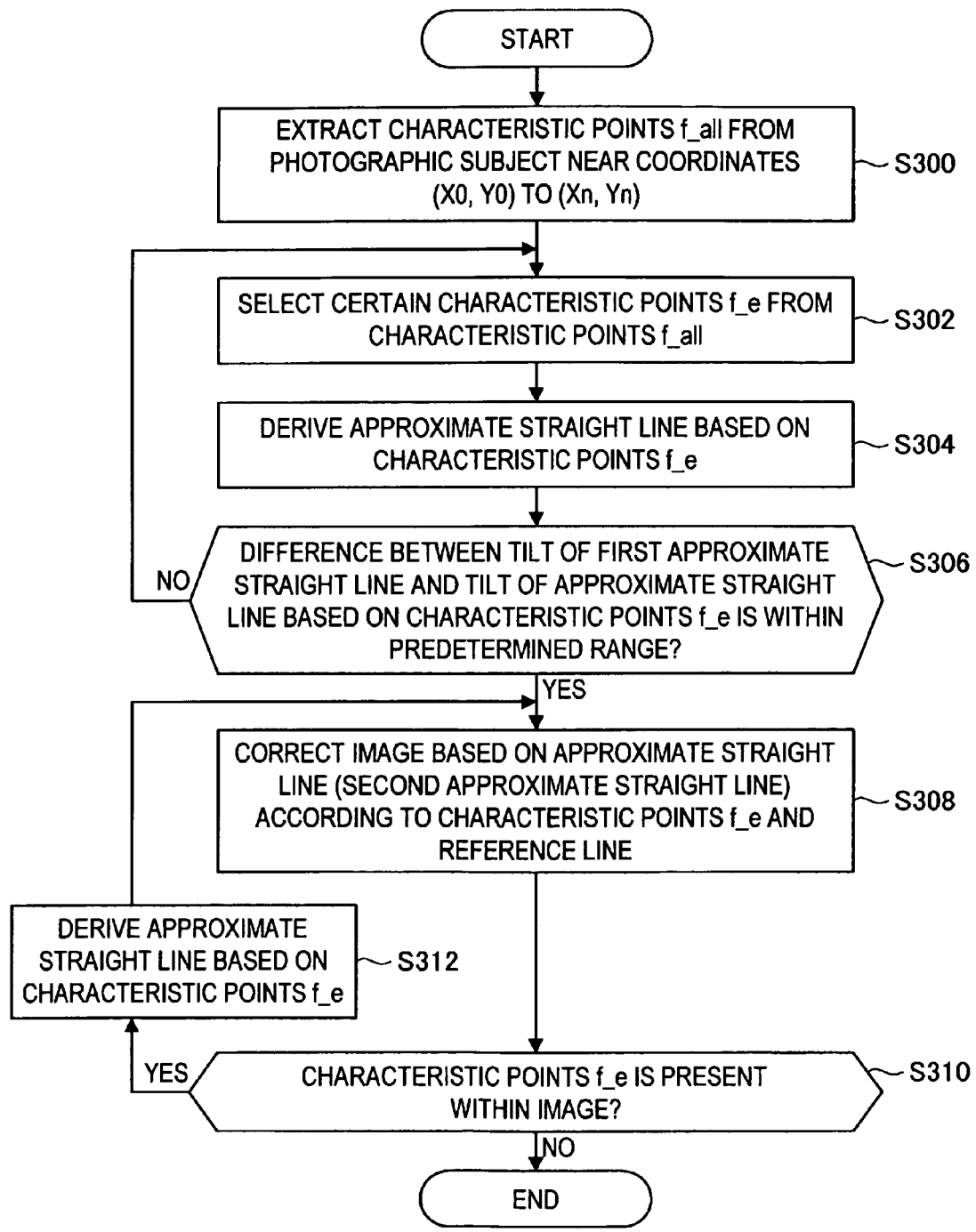
FIG. 8 is a flow diagram showing one example of a following processing according to the embodiment of the present invention.

A following processing according to the embodiment of the present invention will be described below. FIG. 8 is a flow diagram showing one example of the following processing according to the embodiment of the invention.

The imaging apparatus 200 extracts the characteristic points f_all from the photographic subject near the touch coordinates (X0, Y0) to (Xn, Yn) (S300). The imaging apparatus 200 extracts the characteristic points from the photographic subject present within a predetermined distance from the touch coordinates (X0, Y0) to (Xn, Yn), for example, thereby extracting the characteristic points f_all from the image.

When the characteristic points f_all are extracted in step S300, the imaging apparatus 200 selects certain characteristic points f_e from the characteristic points f_all (S302). The imaging apparatus 200 selects certain characteristic points from a certain photographic subject among the photographic subjects contained in the image (for example, a straight line when the photographic subject is a building, or the positions of face, shoulders or legs of a person when the photographic subject is a person), thereby performing the processing in step S302.

When the characteristic points f_e are selected in step S302, the imaging apparatus 200 derives an approximate straight line based on the selected characteristic points f_e (S304). The imaging apparatus 200 can derive the approximate straight line by the least square method, for example, but the derivation method is not limited thereto.

When the approximate straight line is derived in step S304, the imaging apparatus 200 determines whether a difference between the tilt of the first approximate straight line and the tilt of the approximate straight line based on the characteristic points f_e is within a predetermined range (S306). The imaging apparatus 200 can make the determination in step S306 based on the value of the difference and the threshold value indicating the predetermined range, but the determination method is not limited thereto. Furthermore, the threshold value can be assumed as a predetermined fixed value, for example, but is not limited thereto and may be a variable value by the operation input.

When it is determined in step S306 that the difference between the tilts is not within the predetermined range, the imaging apparatus 200 repeats the processing after step S302. At this time, the imaging apparatus 200 selects different characteristic points f_e from the characteristic points by which the approximate straight line has been derived for the determination in step S306.

When it is determined in step S306 that the difference between the tilts is within the predetermined range, the imaging apparatus 200 corrects the tilt of the image based on the approximate straight line for the characteristic points f_e (second approximate straight line) and the reference line. The imaging apparatus 200 can correct the tilt of the image through the above processing (2-1) or (2-2), for example.

When the image is corrected in step S306, the imaging apparatus 200 determines whether the characteristic points f_e for the second approximate straight line is present within the image (S310).

When it is determined in step S310 that the characteristic points f_e are present within the image, the imaging apparatus 200 derives the approximate straight line (second approximate straight line) based on the characteristic points f_e (S312). Then, the imaging apparatus 200 repeats the processing after step S308.

When it is not determined in step S310 that the characteristic points f_e are present within the image, the imaging apparatus 200 terminates the following processing.

When the contents of the image displayed on the display screen do not largely change by the processing shown in FIG. 8, for example, the imaging apparatus 200 can correct the tilt relative to the horizontal direction of the image without an operation input.

The imaging apparatus 200 can perform the processings shown in FIGS. 4, 7 and 8, for example, to realize the processing (2) (image tilt correction processing) and the processing (3) (following processing).

[Another Example of Image Tilt Correction Processing According to the Embodiment of the Present Invention]

There has been described the image tilt correction processing based on the first approximate straight line based on the operation input and the reference line as the image tilt correction processing according to the embodiment of the present invention. However, the image tilt correction processing according to the embodiment of the invention is not limited to the above processing.

Figure 9:
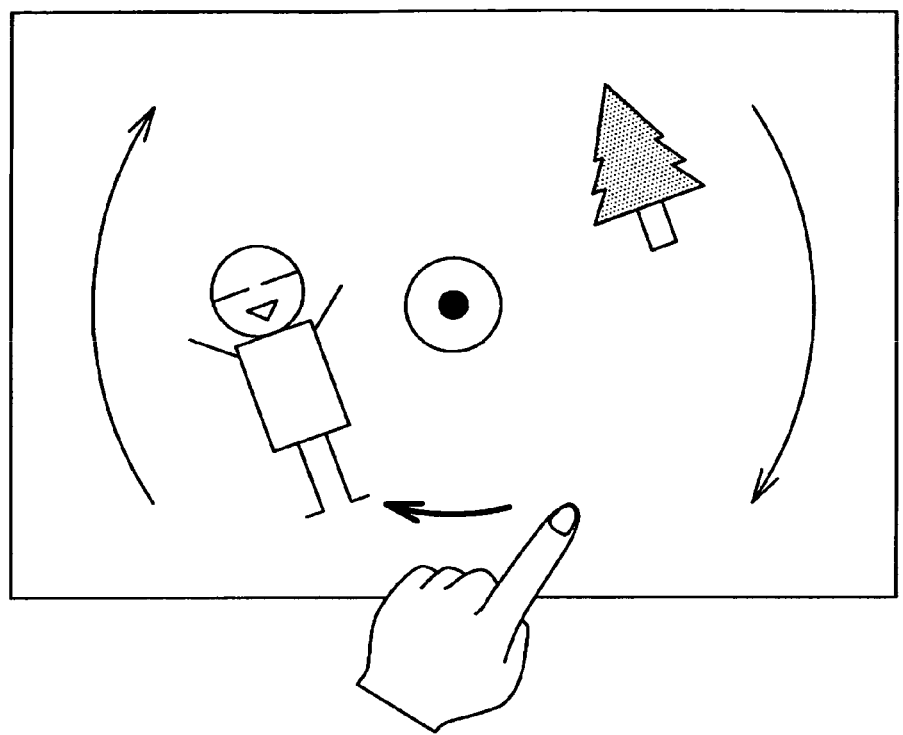
FIG. 9 is an explanatory diagram for explaining another example of the correction processing according to the embodiment of the present invention.
Figure 10:
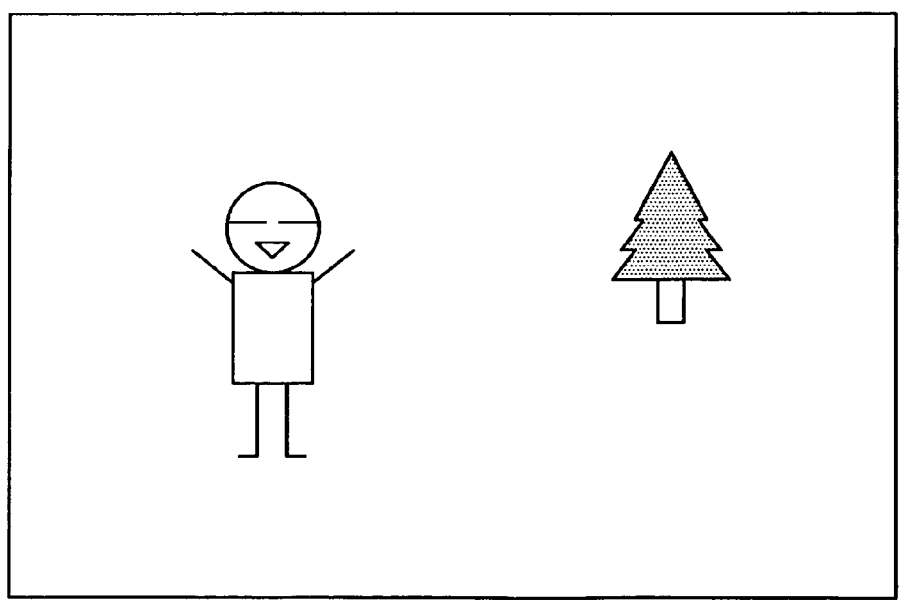
FIG. 10 is an explanatory diagram for explaining another example of the correction processing according to the embodiment of the present invention.

FIGS. 9 and 10 are explanatory diagrams for explaining another example of the correction processing according to the embodiment of the present invention, respectively. FIG. 9 shows one example of an uncorrected image displayed on the display screen, from which it can be seen that the photographic subjects (person and tree) are tilted in the horizontal direction of the image. FIG. 10 shows one example of a corrected image displayed on the display screen, from which it can be seen that the tilt of the image shown in FIG. 9 has been corrected by rotating the image.

As shown in FIG. 9, the imaging apparatus 200 can arbitrarily rotate the image based on the operation input. Since the correction is performed based on the operation input also in the above case, the imaging apparatus 200 will not correct the image tilt based on a user-unintended straight line unlike the technique in related art for obtaining a horizontally-maintained photographed image without a tilt sensor. Thus, the imaging apparatus 200 can more accurately correct the tilt relative to the horizontal direction of the image than the technique in related art. Furthermore, even when the first approximate straight line based on the user's trajectory T is slightly offset from the user-intended line, fine adjustment can be performed.

The approach of correcting a tilt relative to the horizontal direction of an image described above is used so that the image processing apparatus 100 and the imaging apparatus 200 according to the embodiment of the present invention can correct the tilt relative to the horizontal direction of the image based on the operation input, respectively. Hereinafter, there will be described the configuration examples of the image processing apparatus 100 and the imaging apparatus 200 according to the embodiment of the present invention capable of realizing the processing (1) (approximate straight line derivation processing based on trajectory by operation input) to the processing (3) (following processing), respectively.

(Image Processing Apparatus 100 According to the Embodiment of the Present Invention)

Figure 11:
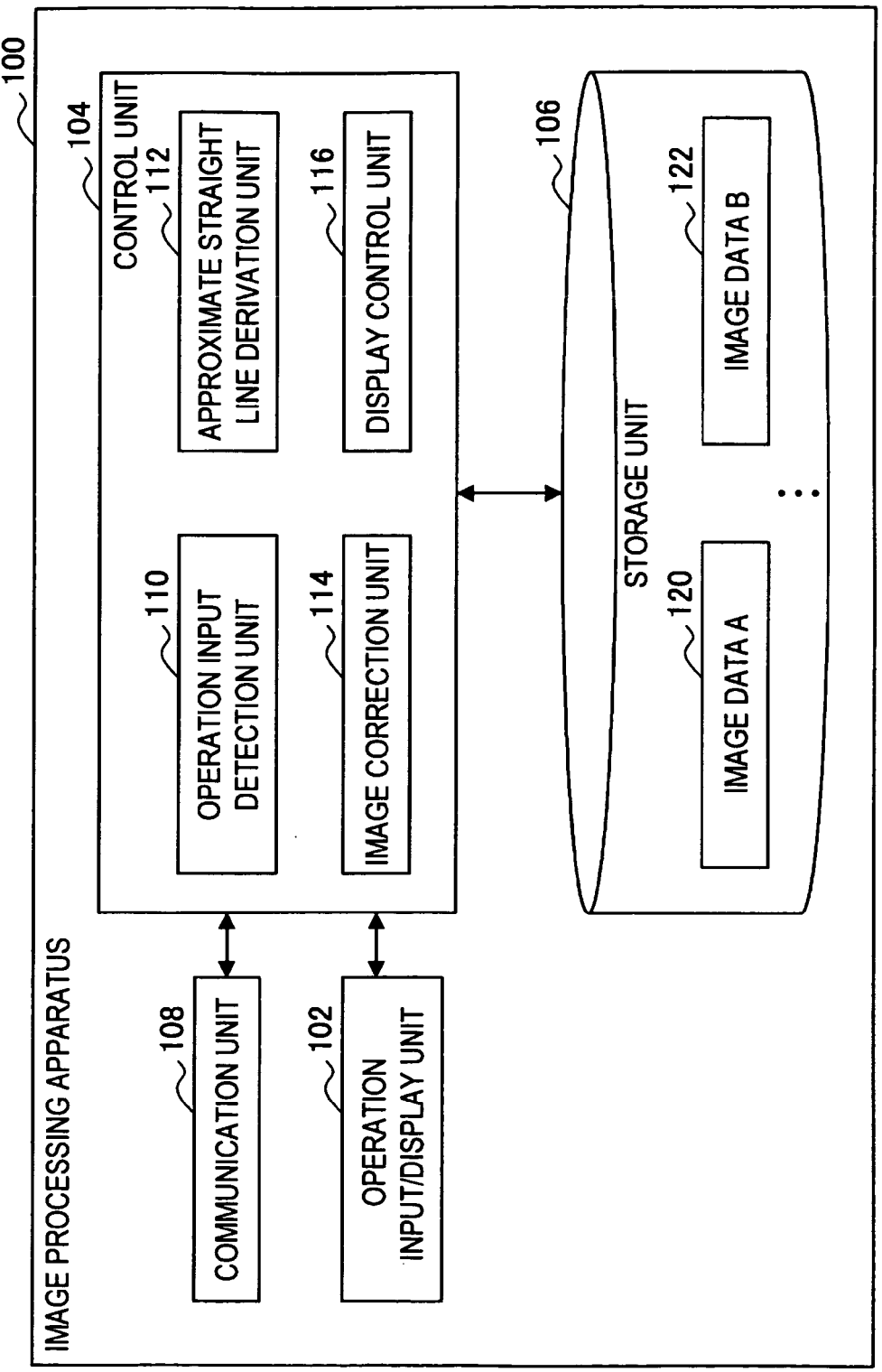
FIG. 11 is a block diagram showing one example of a configuration of an image processing apparatus according to the embodiment of the present invention.

FIG. 11 is a block diagram showing one example of the configuration of the image processing apparatus 100 according to the embodiment of the present invention.

With reference to FIG. 11, the image processing apparatus 100 includes an operation input unit 102, a control unit 104, a storage unit 106 and a communication unit 108.

The image processing apparatus 100 may include a ROM (Read Only Memory: not shown) recording therein control data such as programs or calculation parameters used by the control unit 104, a RAM (Random Access Memory: not shown) temporarily storing therein programs executed by the control unit 106, or the like. The image processing apparatus 100 connects the above constituents via a bus as data transmission path, for example.

[Hardware Configuration Example of Image Processing Apparatus 100]

Figure 12:
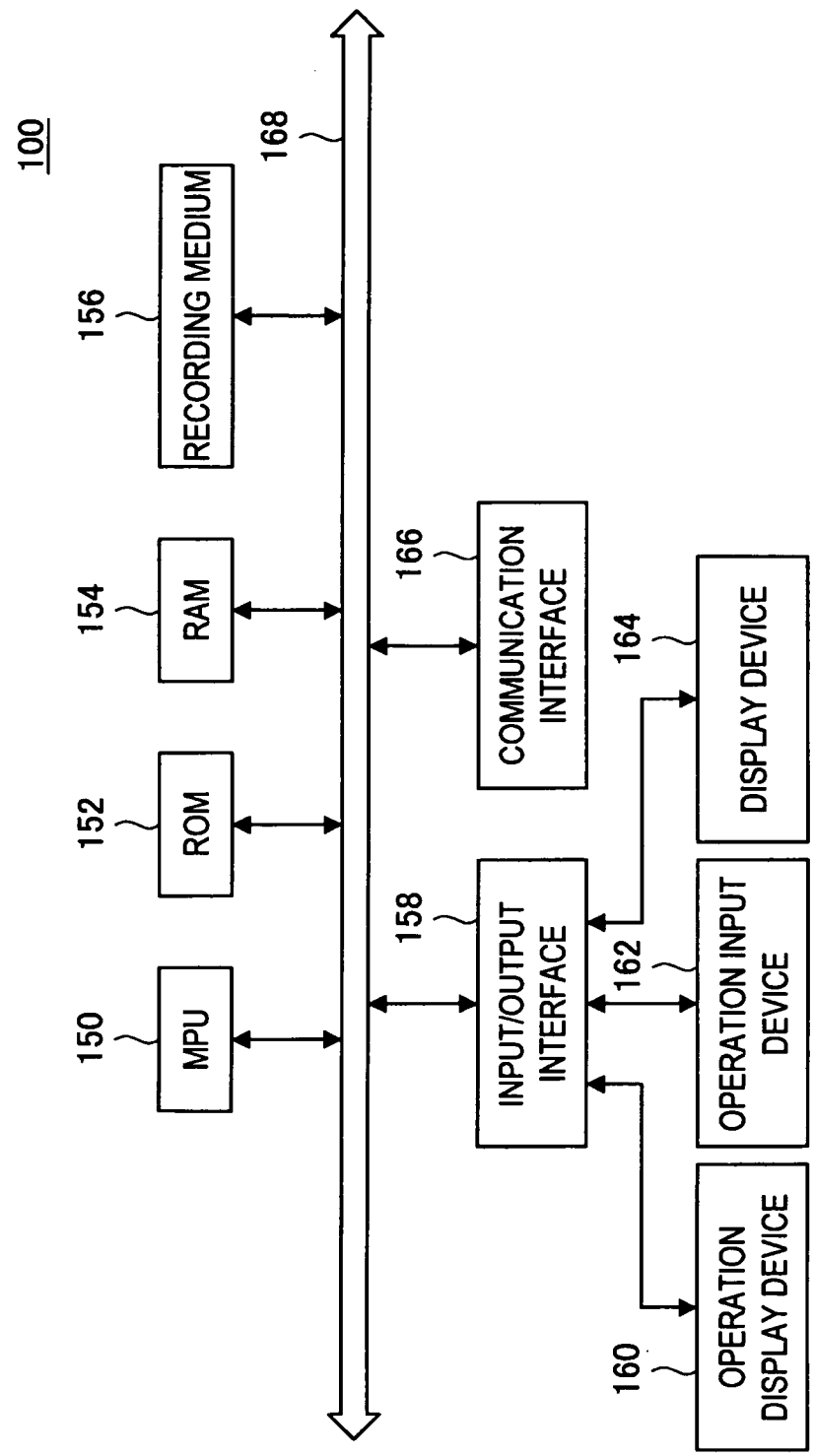
FIG. 12 is an explanatory diagram showing one example of a hardware configuration of the image processing apparatus according to the embodiment of the present invention.

FIG. 12 is an explanatory diagram showing one example of a hardware configuration of the image processing apparatus 100 according to the embodiment of the present invention. With reference to FIG. 12, the image processing apparatus 100 includes a MPU 150, a ROM 152, a RAM 154, a recording medium 156, an input/output interface 158, an operation display device 160, an operation input device 162, a display device 164 and a communication interface 166. Furthermore, the image processing apparatus 100 connects the constituents via a bus 168 as data transmission path, for example.

The MPU 150 functions as the control unit 104 for controlling the entire image processing apparatus 100. Furthermore, the MPU 150 can function as an operation input detection unit 110, an approximate straight line derivation unit 112, an image correction unit 114 and a display control unit 116 described later, for example.

The MPU 150 can perform an extension processing on the image data read out from various recording mediums (such as the storage unit 106) to display the same on the operation display device 160 (operation input/display unit 102) or the display device 164.

The ROM 152 stores therein control data such as programs or calculation parameters used by the MPU 150, data on the reference line, and the like. The various threshold values described above may be previously recoded in the ROM 152, for example. Furthermore, the RAM 154 temporarily stores therein the programs executed by the MPU 150, the touch coordinate (Xn, Yn) corresponding to the operation input, or the like.

The recording medium 156 functions as the storage unit 106, and stores therein image data, applications and the like, for example. The recording medium 156 includes, but is not limited to, a magnetic recording medium such as hard disk or a nonvolatile memory such as EEPROM (Electrically Erasable and Programmable Read Only Memory), flash memory, MRAM (Magnetoresistive Random Access Memory), FeRAM (Ferroelectric Random Access Memory) or PRAM (Phase change Random Access Memory).

The input/output interface 158 connects the operation display device 160, the operation input device 162, the display device 164 and the like, for example. The input/output interface 162 includes, but is not limited to, USB (Universal Serial Bus) terminal, DVI (Digital Visual Interface) terminal, HDMI (High-Definition Multimedia Interface) terminal and the like.

The operation display device 160 functions as the operation input/display unit 102, displays an image on the display screen, and enables the operation input on the image displayed on the display screen. The operation display device 160 is configured with, for example, a touch screen, and is connected to the input/output interface 160 inside the image processing apparatus 100. Furthermore, the touch screen is realized by a display device such as LDC (Liquid Crystal Display), organic electroluminescence display or OLED (Organic Light Emitting Diode) display and a matrix switch in which devices for detecting a contact are arranged, but is not limited thereto.

The operation input device 162 is provided on the image processing apparatus 100 in the form of, for example, buttons, directional keys, rotational selector such as jog dial, or combination thereof, and is connected to the input/output interface 158 inside the image processing apparatus 100. The operation input device 162 functions as the operation input/display unit 102 (or the operation unit (not shown)) in the image processing apparatus 100.

The display device 164 is configured with, for example, LCD, organic EL display or the like, and is provided on the image processing apparatus 100. The display device 164 is connected to the input/output interface 158 inside the image processing apparatus 100, for example. The display device 164 functions as the operation input/display unit 102 (or the display unit (not shown)) in the image processing apparatus 100.

The input/output interface 158 may be connected to an operation display device (such as liquid crystal pen tablet), operation input device (such as keyboard or mouse) or display device (such as external display) as an external device to the image processing apparatus 100.

The communication interface 166 is a communication means provided in the image processing apparatus 100, and functions as the communication unit 108 for making wireless/wired communication with an external device via a network (or directly). The network includes, but is not limited to, a wired network such as LAN (Local Area network) or WAN (Wide Area Network), a wireless network such as WWAN (Wireless Wide Area Network) or WMAN (Wireless Metropolitan Area Network) via a base station, or Internet using a communication protocol such as TCP/IP (Transmission Control Protocol/Internet Protocol). The image processing apparatus 100 can directly communicate with an external device through USB connection, for example.

The communication interface 166 includes, but is not limited to, communication antenna and RF circuit (wireless communication), the IEEE 802.15.1 port and transmission/reception circuit (wireless communication), the IEEE 802.11b port and transmission/reception circuit (wireless communication), LAN terminal and transmission/reception circuit (wired communication), or USB port and USB controller (wired communication/wireless communication). For example, the communication interface 166 may be configured to correspond to the network.

The image processing apparatus 100 performs the processing (1) (approximate straight line derivation processing based on trajectory by operation input) to the processing (3) (following processing) with the hardware configuration shown in FIG. 12. Thus, the image processing apparatus 100 can correct the tilt relative to the horizontal direction of the image based on the operation input.

The hardware configuration of the image processing apparatus 100 is not limited to the configuration illustrated in FIG. 12. For example, the image processing apparatus 100 may include various devices such as a microphone as speech input device or a speaker as speech output device. The image processing apparatus 100 may include a slot for housing therein a detachable external memory such as memory stick.

Returning to FIG. 11 again, the configuration of the image processing apparatus 100 will be described. The operation input/display unit 102 (operation display unit) displays an image on the display screen and enables the operation input for the image displayed on the display screen. The operation input/display unit 102 is provided so that the image processing apparatus 100 enables the presentation of the image to the user and the operation input, and can recognize the user's trajectory "T" as shown in FIG. 2, for example. In other words, the operation input/display unit 102 functions as an input device for performing the processing (1) (approximate straight line derivation processing based on trajectory by operation input). The operation input/display unit 102 is configured with, for example, a touch screen but is not limited thereto. For example, the operation input/display unit 102 is configured with a display device and a pointing device, and may be configured to perform the operation input on the image displayed on the display screen by user's operating the pointing device.

The control unit 104 is configured with, for example, the MPU, and serves to control the entire image processing apparatus 100. Furthermore, the control unit 104 includes the operation input detection unit 110, the approximate straight line derivation unit 112, the image correction unit 114 and the display control unit 116.

The operation input detection unit 110 detects the operation input in the operation input/display unit 102 and holds the touch coordinate (Xn, Yn) corresponding to the operation input in the RAM 154, for example. The operation input detection unit 110 can detect the operation input based on an operation signal (such as signal corresponding to a pressure change or electrostatic signal) transmitted in response to the operation input from the operation input/display unit 102, for example. Thus, the operation input detection unit 110 serves to perform part of the processing (1) (approximate straight line derivation processing based on trajectory by operation input).

The approximate straight line derivation unit 112 derives the first approximate straight line approximately indicating the trajectory of the operation input based on the detection result in the operation input detection unit 110, that is the touch coordinate (Xn, Yn).

The approximate straight line derivation unit 112 can detect predetermined characteristic points f_e from the image displayed on the display screen and further derive the approximate straight line based on the characteristic points f_e.

Thus, the approximate straight line derivation unit 112 serves to perform part of the processing (1) (approximate straight line derivation processing based on trajectory by operation input) and part of the processing (3) (following processing).

The image correction unit 114 serves to perform the above processing (2) (image tilt correction processing) and corrects the tilt of the image displayed on the display screen based on the first approximate straight line and the predetermined reference line. The correction of the image tilt in the image correction unit 114 corresponds to the correction by the signal processing.

Furthermore, the image correction unit 114 can determine the second approximate straight line from the approximate straight lines based on the characteristic points f_e derived by the approximate straight line derivation unit 112 and correct the tilt of the image displayed on the display screen based on the second approximate straight line and the reference line. In the above case, when the characteristic points f_e for the second approximate straight line are not present within the image displayed on the display screen, the image correction unit 114 terminates the correction of the image tilt.

Thus, the image correction unit 114 serves to perform the above processing (2) (image tilt correction processing) and part of the processing (3) (following processing). The image correction unit 114 can record the image corrected in the correction processing and the following processing in the recording medium such as the storage unit 106 or external memory.

The display control unit 116 controls to display image or characters in the operation input/display unit 102 or the display unit (not shown). The display control unit 116 can be provided to reproduce and display the image data stored in the storage unit 106 or the image data obtained by the communication unit 108 from the external device on the operation input/display unit 102, for example.

The image processing apparatus 100 can include the operation input detection unit 110, the approximate straight line derivation unit 112 and the image correction unit 114 to perform the above processings (1) to (3).

The storage unit 106 is a storage means provided in the image processing apparatus 100. The storage unit 106 stores therein image data or applications executed by the control unit 104, for example. FIG. 11 shows an example in which the image data 120, 122, ... are stored in the storage unit 106. The storage unit 106 includes, but is not limited to, a magnetic recording medium such as hard disk or a nonvolatile memory such as flash memory.

The communication unit 108 is a communication means provided in the image processing apparatus 100 and serves to make wired/wireless communication with an external device. The communication unit 108 is controlled by, for example, the control unit 104 for its communication. The image processing apparatus 100 can include the communication unit 108 to obtain image data or applications from an external device and to transmit the image data recorded in the storage unit 106 to the external device.

The image processing apparatus 100 performs the processing (1) (approximate straight line derivation processing based on trajectory by operation input), the processing (2) (image tilt correction processing) and the processing (3) (following processing) with the above configuration. Thus, the image processing apparatus 100 can correct the tilt relative to the horizontal direction of the image based on the operation input with the above configuration.

[A Series of Processings in the Image Processing Apparatus 100]

Figure 13:
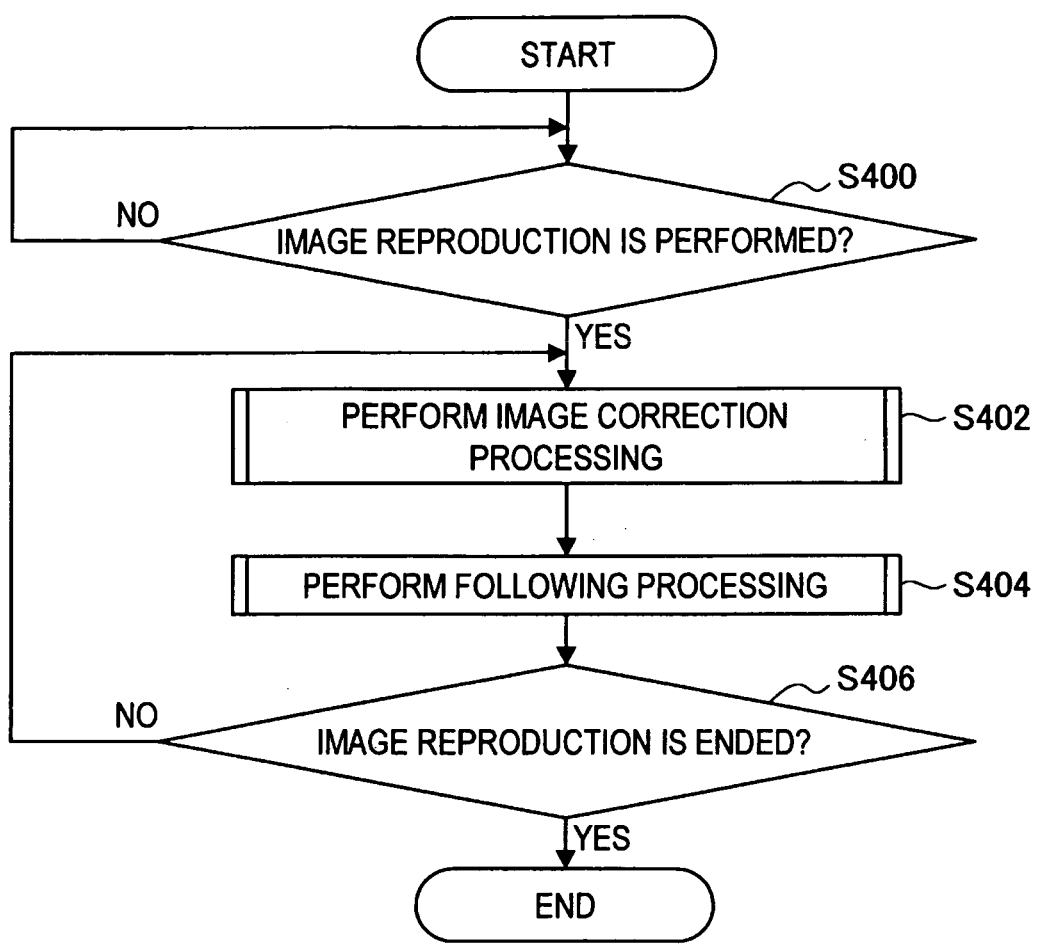
FIG. 13 is a flow diagram showing one example of an image tilt correction processing in the image processing apparatus according to the embodiment of the present invention.

A series of processings for the image tilt correction in the image processing apparatus 100 will be described below. FIG. 13 is a flow diagram showing one example of the image tilt correction processing in the image processing apparatus 100 according to the embodiment of the present invention.

The image processing apparatus 100 determines whether to reproduce the image (S400). The image processing apparatus 100 can make the determination in step S400 based on an operation signal transmitted from the operation unit (not shown) in response to the user's operation input such as user's pressing of reproduction button, for example. When it is not determined in step S400 that the image will be reproduced, the image processing apparatus 100 may not proceed with the processing until it is determined that the image will be reproduced.

When it is determined in step S400 that the image will be reproduced, the image processing apparatus 100 performs the image correction processing (S402). The image correction processing performed by the image processing apparatus 100 includes, but is not limited to, the first correction processing shown in FIG. 4 or the second correction processing shown in FIG. 7, for example. The image processing apparatus 100 can also record the image corrected in step S402 in the recording medium such as the storage unit 106.

When the image correction processing is performed in step S402, the image processing apparatus 100 performs the following processing (S404). The image processing apparatus 100 can realize the following processing by the processing shown in FIG. 8, for example. The image processing apparatus 100 can record the image corrected in the following processing in step S404 in the recording medium such as the storage unit 106.

When the following processing is terminated in step S404, the image processing apparatus 100 determines whether to terminate the reproduction of the image (S406). The image processing apparatus 100 can make the determination in step S406 based on the user's operation input similarly to step S400, for example.

When it is not determined in step S406 that the reproduction of the image will be terminated, the image processing apparatus 100 repeats the processing after step S402. Furthermore, when it is determined in step S406 that the reproduction of the image will be terminated, the image processing apparatus 100 terminates the reproduction of the image. In the above case, the image tilt correction processing in the image processing apparatus 100 will be also terminated.

The image processing apparatus 100 can perform the processing shown in FIG. 13 to correct the tilt relative to the horizontal direction of the image based on the operation input.

As described above, the image processing apparatus 100 according to the embodiment of the present invention derives the first approximate straight line based on the trajectory of the operation input, and corrects the tilt relative to the horizontal direction of the image without a tilt sensor based on the derived first approximate straight line and the predetermined reference line. Since the image processing apparatus 100 derives the first approximate straight line based on the operation input, a photographic subject having a straight line does not need to be present within the frame unlike the technique in related art for obtaining a horizontally-maintained photographed image without a tilt sensor. Since the image processing apparatus 100 derives the first approximate straight line based on the operation input, the tilt of the image will not be corrected based on a user-unintended straight line unlike the technique in related art for obtaining a horizontally-maintained photographed image without a tilt sensor. Thus, the image processing apparatus 100 can more accurately correct the tilt relative to the horizontal direction of the image than the technique in related art.

The image processing apparatus 100 derives the second approximate straight line based on the touch coordinate (Xn, Yn) for the first approximate straight line, and corrects the tilt of the image based on the derived second approximate straight line and the reference line. The image processing apparatus 100 appropriately updates the second approximate straight line to correct the image depending on its contents. When the contents of the image displayed on the display screen have largely changed (for example, when it is not determined that the characteristic points f_e are present within the image), the image processing apparatus 100 terminates the correction using the second approximate straight line. Thus, when the contents of the image displayed on the display screen have not largely changed, the image processing apparatus 100 can correct the tilt relative to the horizontal direction without the operation input.

The embodiment of the present invention has been described by way of example of the image processing apparatus 100 so far, but is not limited thereto. For example, the embodiment of the present invention is applicable to various devices such as an imaging apparatus having an imaging function such as digital camera or cell phone having a digital camera function, a computer such as personal computer, a portable communication device such as cell phone or PHS (Personal Handyphone System), a video/music player such as WALK MAN (registered trademark) and a portable game player such as PlayStation Portable (registered trademark). The application of the embodiment of the present invention to the imaging apparatus will be descried later.

(Program for the Image Processing Apparatus According to the Embodiment of the Invention)

A program for causing a computer to function as the image processing apparatus 100 according to the embodiment of the present invention can correct a tilt relative to the horizontal direction of an image based on an operation input.

(Imaging Apparatus 200 According to the Embodiment of the Present Invention)

Figure 14:
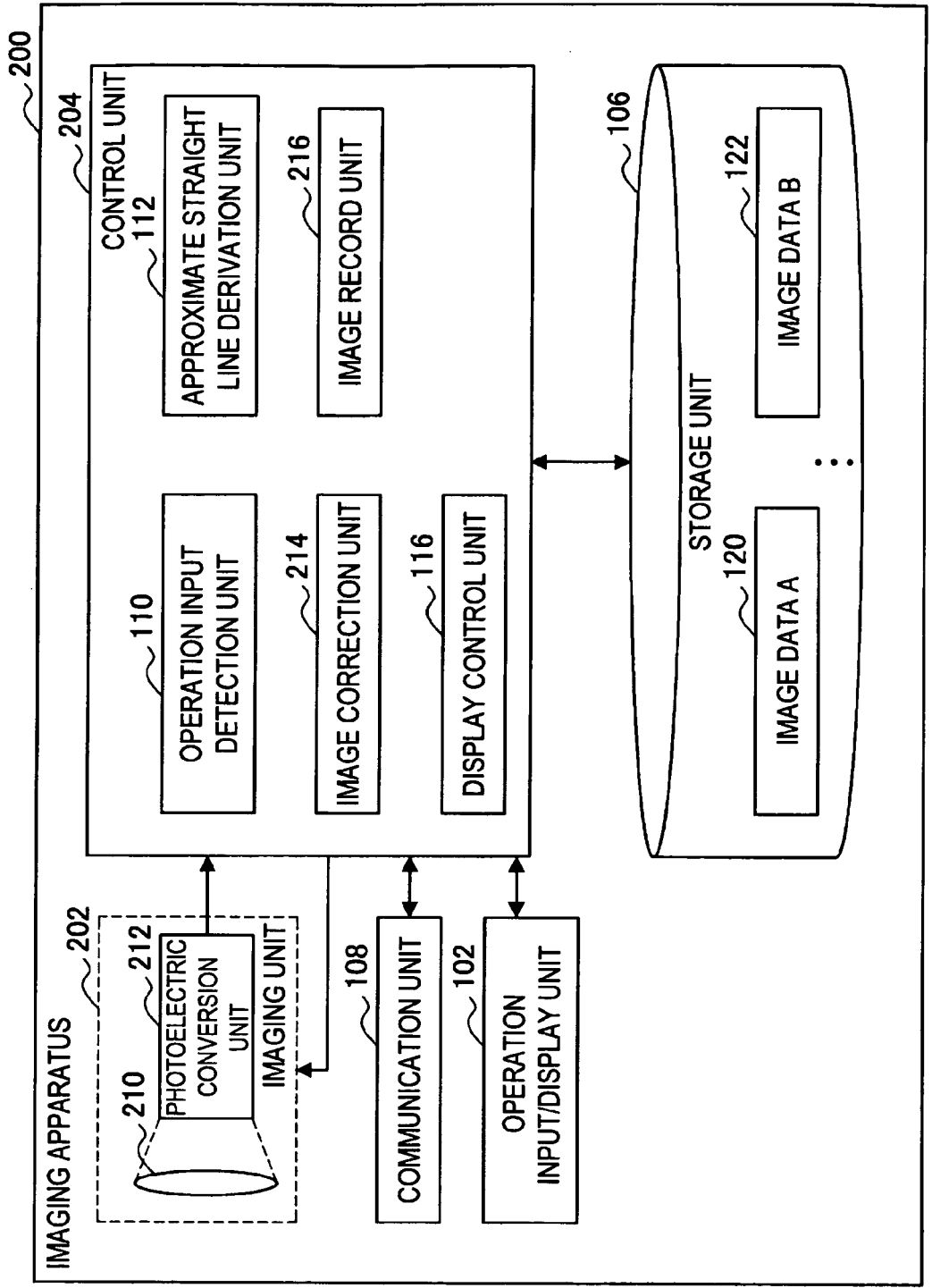
FIG. 14 is a block diagram showing one example of a configuration of an imaging apparatus according to the embodiment of the present invention.

A configuration of the imaging apparatus 200 according to the embodiment of the present invention will be described below. FIG. 14 is a block diagram showing one example of the configuration of the imaging apparatus 200 according to the embodiment of the present invention.

With reference to FIG. 14, the imaging apparatus 200 includes an imaging unit 202, the operation input unit 102, a control unit 204, the storage unit 106 and the communication unit 108.

The imaging apparatus 200 may include a ROM (not shown) recording therein control data such as programs or calculation parameters used by the control unit 204, a RAM (not shown) temporarily storing therein programs executed by the control unit 106, and the like. The imaging apparatus 200 connects the above constituents via a bus as data transmission path, for example.

[Hardware Configuration Example of the Imaging Apparatus 200]

Figure 15:
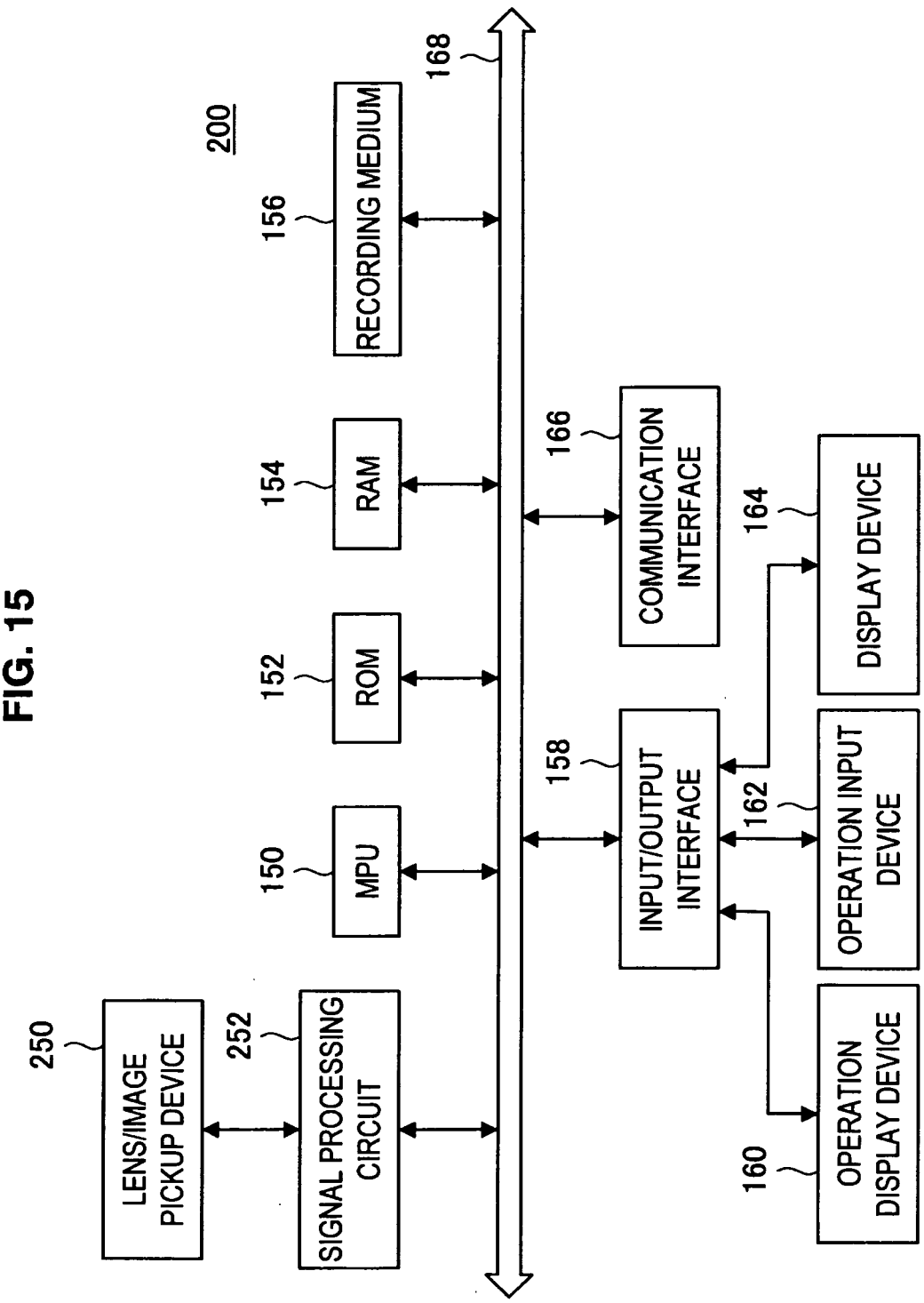
FIG. 15 is an explanatory diagram showing one example of a hardware configuration of the imaging apparatus according to the embodiment of the present invention.

FIG. 15 is an explanatory diagram showing one example of a hardware configuration of the imaging apparatus 200 according to the embodiment of the present invention. With reference to FIG. 15, the imaging apparatus 200 includes a lens/imaging device 250, a signal processing circuit 252, the MPU 150, the ROM 152, the RAM 154, the recording medium 156, the input/output interface 158, the operation display device 160, the operation input device 162, the display device 164 and the communication interface 166. The imaging apparatus 200 connects the constituents via the bus 168 as data transmission path, for example.

The lens/imaging device 250 and the signal processing circuit 252 function as the imaging unit 202. The lens/imaging device 250 is configured with an image sensor using an optical lens and an imaging device such as CCD (Charge Coupled Device) or CMOS (Complementary Metal Oxide Semiconductor). The signal processing circuit 252 includes an AGC (Automatic Gain Control) circuit or ADC (Analog to Digital Converter), for example, and converts an analog signal generated by the imaging device into a digital signal (image data) to perform various signal processings. The signal processings performed by the signal processing circuit 252 include but are not limited to a White Balance correction processing, interpolation processing, color tone correction processing, gamma correction processing, YCbCr conversion processing, edge enhancement processing, Jpeg coding processing and the like. The While Balance correction processing is, for example, a processing of applying a predetermined gain for each color of RGB (Red Green Blue) of RAW image data (image before signal processing) and amplifying a pixel value corresponding to each pixel. The interpolation processing is a processing of creating RGB for all the pixels from the Bayer arrangement, for example. The color tone correction processing is a processing of correcting a color tone of an image, for example. The gamma correction processing is a processing of nonlinearly converting a RGB signal to secure visual linearity. The YCbCr conversion processing is a processing of converting RGB into YCbCr based on a predetermined conversion Formula, for example. Y denotes luminance, Cb denotes chrominance and Cr denotes chrominance, respectively. The edge enhancement processing is a processing of detecting an edge from an image and improving the luminance of the detected edge to enhance a contrast of the image, for example. Then, the Jpeg coding processing is a processing of converting an image into an image file in a Jpeg (Joint Photographic Experts Group) format.

The MPU 150 functions as the control unit 204 for controlling the entire imaging apparatus 200. The MPU 150 can function as the operation input detection unit 110, the approximate straight line derivation unit 112, the image correction unit 214, the image recording unit 216 and the display control unit 116 described later, for example.

The MPU 150 can perform a compression processing on the image data subjected to the signal processing in the signal processing circuit 252 and record the processed data into various recording mediums (such as the storage unit 106). Furthermore, the MPU 150 can perform an extension processing on the image data read out from various recording mediums and display the processed data on the operation display device 160 (operation input/display unit 102) or the display device 164.

The ROM 152, the RAM 154, the recording medium 156, the input/output interface 158, the operation display device 160, the operation input device 162, the display device 164 and the communication interface 166 can have the same functions as in the configuration of the image processing apparatus 100 shown in FIG. 12, respectively.

Thus, the imaging apparatus 200 performs the processing (1) (approximate straight line derivation processing based on trajectory by operation input) to the processing (3) (following processing) with the hardware configuration shown in FIG. 15. Therefore, the imaging apparatus 200 can correct the tilt relative to the horizontal direction of the image based on the operation input.

The imaging apparatus 200 can also record the corrected image in a recording medium. The recording medium recording therein an image by the imaging apparatus 200 includes, but is not limited to, the recording medium 156, for example. For example, the imaging apparatus 200 can further include a slot (not shown) for housing therein a detachable external memory (one type of recording medium) and record an image in the external memory housed in the slot. The external memory includes, but is not limited to, the memory stick, for example. Furthermore, the imaging apparatus 200 can also record an image in the storage unit (one type of recording medium) included by the external device via the communication interface 166.

Returning to FIG. 14 again, the configuration of the imaging apparatus 200 will be described. The imaging unit 202 is an imaging means included in the imaging apparatus 200, which can obtain an image (photographed image) by imaging. The image obtained by the imaging includes, but is not limited to, an image (still image) recorded in a still image format such as JPEG or bitmap or an image (animation) recorded in an animation format such as WMV (Windows Media Video) or H.264/MPEG-4 AVC (H.264/Moving Picture Experts Group phase-4 Advanced Video Coding), for example.

The imaging unit 202 is configured with a lens 210 and a photoelectric conversion unit 212. The photoelectric conversion unit 212 is configured with an image sensor in which imaging devices such as CCD or CMOS are arranged in a matrix shape (a combination with the lens 210 may be assumed as the image sensor) and the signal processing circuit 252.

The imaging unit 202 can rotate the lens 210 or the image sensor, for example, in response to a correction signal transmitted from the control unit 204 (more strictly, the image correction unit 214 described later). The imaging unit 202 is configured to be able to rotate the lens 210 or image sensor as described above so that the imaging apparatus 200 can physically correct the tilt of the photographed image.

The control unit 204 is configured with the MPU or the like, for example, and serves to control the entire imaging apparatus 200. The control unit 204 includes the operation input detection unit 110, the approximate straight line derivation unit 112, the image correction unit 214 and the display control unit 116.

The operation input detection unit 110, the approximate straight line derivation unit 112 and the display control unit 116 have the same functions and configurations of the operation input detection unit 110, the approximate straight line derivation unit 112 and the display control unit 116 in the image processing apparatus 100 shown in FIG. 11, respectively.

The image correction unit 214 serves to perform the above processing (2) (image tilt correction processing) and corrects the tilt of the image displayed on the display screen based on the first approximate straight line and the predetermined reference line. The image correction unit 214 can correct the tilt of the image by any of the following corrections (A) to (C) or combination thereof. The correction of the image tilt in the imaging apparatus 200 is not limited to the following corrections (A) to (C). For example, the imaging apparatus 200 can use a mirror to rotate the image.

(A) Correction by Signal Processing

The image correction unit 214 corrects the tilt of the image similarly to the image correction unit 114 in the image processing apparatus 100 shown in FIG. 11.

(B) Correction By Rotation of the Imaging Unit 202

The image correction unit 214 generates a correction signal corresponding to an angle for rotating the image, and transmits the correction signal to the imaging unit 202. The correction (B) is directed for physically rotating the imaging unit 202 to rotate the image. The correction (A) and the correction (B) are combined, thereby realizing the above correction processing (2-2) (second tilt correction processing).

(C) Correction By Rotation of the Image Sensor

The image correction unit 214 generates a correction signal corresponding to an angle for rotating the image, and transmits the correction signal to the imaging unit 202 similarly to the correction (B). The correction (C) is directed for physically rotating the image sensor to rotate the image. Furthermore, the correction (A) and the correction (C) are combined, thereby realizing the above correction processing (2-2) (second tilt correction processing) similarly to the correction (B).

The image correction unit 214 can determine the second approximate straight line from the approximate straight lines based on the characteristic points f_e derived by the approximate straight line derivation unit 112 and correct the tilt of the image displayed on the display screen based on the second approximate straight line and the reference line similarly to the image correction unit 114 in the image processing apparatus 100 shown in FIG. 11.

Thus, the image correction unit 214 serves to perform the above processing (2) (image tilt correction processing) and part of the processing (3) (following processing) similarly to the image correction unit 114 in the image processing apparatus 100 shown in FIG. 11.

The imaging apparatus 200 includes the operation input detection unit 110, the approximate straight line derivation unit 112 and the image correction unit 214, thereby performing the above processings (1) to (3).

The image recording unit 216 records the image corrected by the image correction unit 216 in the recording medium. The recording medium includes the storage unit 106, the external memory housed in the slot (not shown), a storage unit included in the external device (not shown) connected via the communication unit 108, and the like, for example.

The imaging apparatus 200 performs the processing (1) (approximate straight line derivation processing based on trajectory by operation input), the processing (2) (image tilt correction processing), and the processing (3) (following processing) with the above configuration. Thus, the imaging apparatus 200 can correct the tilt relative to the horizontal direction of the image based on the operation input similarly to the image processing apparatus 100 shown in FIG. 11.

The imaging apparatus 200 records the tilt-corrected image in the recording medium with the above configuration. Thus, an apparatus for reproducing the image recorded by the imaging apparatus 200 can display the image whose tilt relative to the horizontal direction has been corrected on the display screen without special correction.

[A Series of Processings in the Imaging Apparatus 200]

Figure 16:
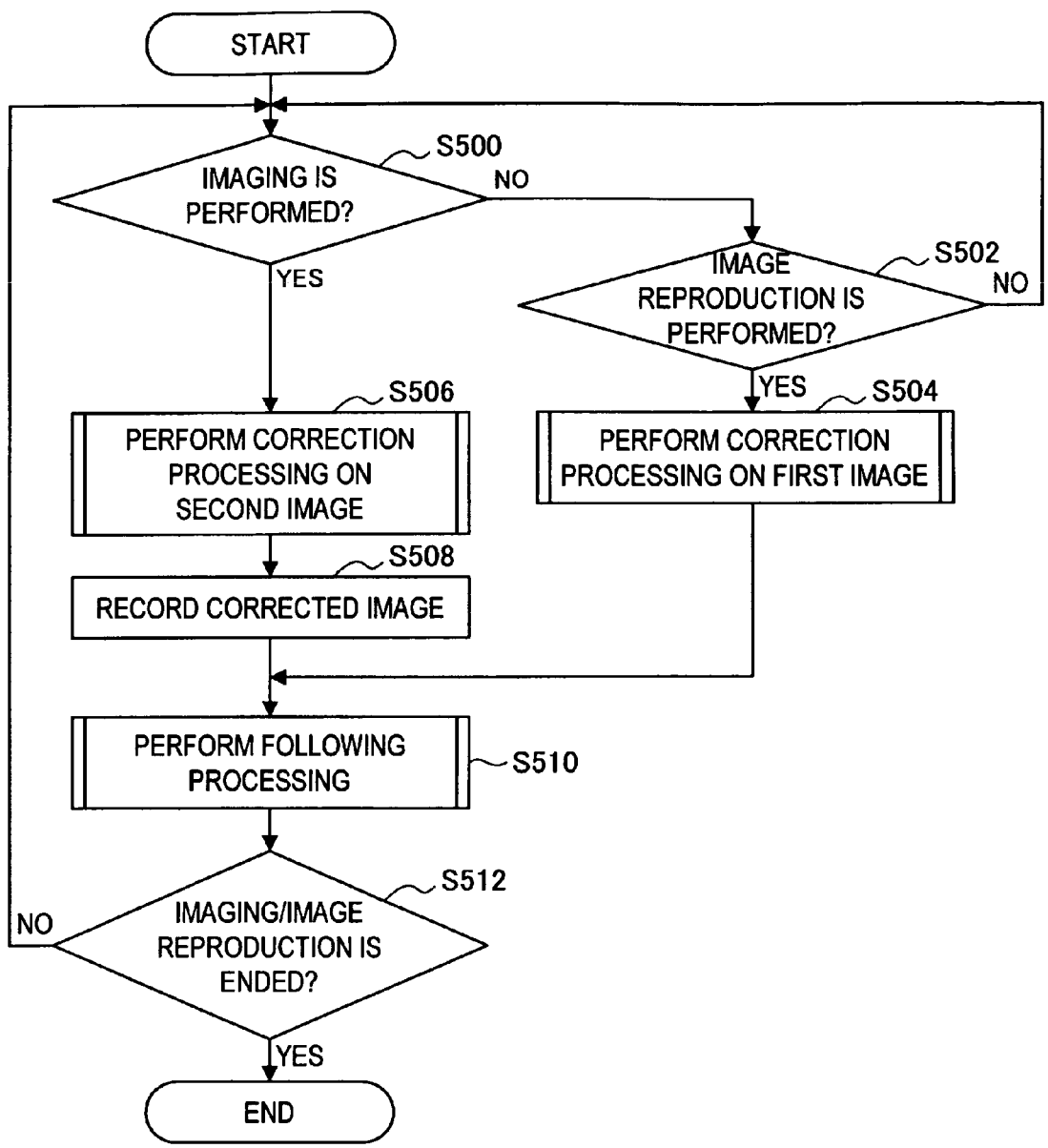
FIG. 16 is a flow diagram showing one example of an image tilt correction processing in the imaging apparatus according to the embodiment of the present invention.

A series of image tilt correction processings in the imaging apparatus 200 will be described below. FIG. 16 is a flow diagram showing one example of the image tilt correction processing in the imaging apparatus 200 according to the embodiment of the present invention.

The imaging apparatus 200 determines whether to perform imaging (S500). The imaging apparatus 200 can make the determination in step S500 based on an operation signal transmitted from the operation unit (not shown) in response to a user's operation input such as user's pressing of imaging button.

[When not Determining that Imaging is Performed]

When it is not determined in step S500 that the imaging will be performed, the imaging apparatus 200 determines whether to reproduce the image (S502). The imaging apparatus 200 can make the determination in step S502 based on an operation signal transmitted from the operation unit (not shown) in response to a user's operation input, for example, similarly to step S400 of FIG. 13. When it is not determined in step S502 that the image will be reproduced, the imaging apparatus 200 repeats the processing after step S502.

When it is determined in step S502 that the image will be reproduced, the imaging apparatus 200 performs the first image correction processing (S504). The first image correction processing refers to the above processing (A) (correction by signal processing). In other words, the imaging apparatus 200 corrects the tilt of the image by the similar processing to step S402 of FIG. 13.

When the image correction processing is performed in step S504, the imaging apparatus 200 performs the following processing (S510). The imaging apparatus 200 can realize the following processing by the processing shown in FIG. 8, for example, similarly to step S404 of FIG. 13.

When the following processing is terminated in step S510, the imaging apparatus 200 determines whether to terminate the imaging and reproduction of the image (S512). The imaging apparatus 200 can make the determination in step S508 based on a user's operation input similarly to step S500 or step S502, for example.

When it is not determined in step S512 that the imaging and reproduction of the image will be terminated, the imaging apparatus 200 repeats the processing after step S500. When it is determined in step S512 that the imaging and reproduction of the image will be terminated, the imaging apparatus 200 terminates the imaging and reproduction of the image. In the above, case, the image tilt correction processing in the imaging apparatus 200 will be also terminated.

[When Determining that Imaging is Performed]

When it is determined in step S500 that the imaging will be performed, the imaging apparatus 200 performs the second image correction processing (S506). The second image correction processing refers to any one of the above processing (A) (correction by signal processing) to the processing (C) (correction by rotation of image sensor) or combination thereof, for example.

When the image correction processing is performed in step S506, the imaging apparatus 200 records the corrected image in the recording medium (S508). Then, the imaging apparatus 200 performs the following processing (S510). Though not shown in FIG. 16, the imaging apparatus 200 continues to record the corrected image in the recording medium in the following processing. Then, when the following processing is terminated in step S510, the imaging apparatus 200 determines whether to terminate the imaging and reproduction of the image (S512), and terminates the imaging and reproduction of the image in response to the determination result.

The imaging apparatus 200 can perform the processing shown in FIG. 16 to correct the tilt relative to the horizontal direction of the image based on the operation input.

As described above, the imaging apparatus 200 according to the embodiment of the present invention derives the first approximate straight line based on the trajectory of the operation input, and corrects the tilt relative to the horizontal direction of the image based on the derived first approximate straight line and the predetermined reference line without a tilt sensor. Since the imaging apparatus 200 derives the first approximate straight line based on the operation input similarly to the image processing apparatus 100, a photographic subject having a straight line does not need to be present within the frame unlike the technique in related art for obtaining a horizontally-maintained photographed image without a tilt sensor. Furthermore, since the imaging apparatus 200 derives the first approximate straight line based on the operation input, the tilt of the image will not be corrected based on a user-unintended straight line unlike the technique in related art for obtaining a horizontally-maintained photographed image without a tilt sensor. Thus, the imaging apparatus 200 can more accurately correct the tilt relative to the horizontal direction of the image than the technique in related art similarly to the image processing apparatus 100. Furthermore, even when the first approximate straight line based on the user's trajectory T is slightly offset from the user-intended line, the imaging apparatus 200 can perform fine adjustment similarly to the image processing apparatus 100.

The imaging apparatus 200 derives the second approximate straight line based on the touch coordinate (Xn, Yn) for the first approximate straight line and corrects the tilt of the image based on the derived second approximate straight line and the reference line similarly to the image processing apparatus 100. The imaging apparatus 200 appropriately updates the second approximate straight line to perform the correction depending on the contents of the image. When the contents of the image displayed on the display screen have largely changed, the imaging apparatus 200 terminates the correction using the second approximate straight line. Thus, even when the contents of the image displayed on the display screen have not largely changed, the imaging apparatus 200 can correct the tilt relative to the horizontal direction of the image without the operation input.

Since the imaging apparatus 200 can correct the tilt of the image also during the imaging, it is possible to obtain an image (photographed image) having a fine tilt (or no tilt) relative to the horizontal direction even where the horizontal imaging is difficult due to unable setting of a tripod, for example.

The embodiment of the present invention has been described by way of example of the imaging apparatus 200 but is not limited thereto. The embodiment of the present invention is applicable to various devices having an imaging function such as digital camera, cell phone having a digital camera function, computer such as PC having a camera, and portable game player having a camera.

(Program for the Imaging Apparatus According to the Embodiment of the Present Invention)

A program for causing a computer to function as the imaging apparatus 200 according to the embodiment of the present invention can correct a tilt relative to the horizontal direction of an image based on an operation input.

It should be understood by those skilled in the art that various modifications, combinations, sub-combinations and alterations may occur depending on design requirements and other factors insofar as they are within the scope of the appended claims or the equivalents thereof.

There has been described the case where the program (computer program) for causing the computer to function as the image processing apparatus 100 and the imaging apparatus 200 according to the embodiment of the present invention is provided, but the embodiment of the present invention can further provide a storage medium storing therein the program.

There have been described the image processing apparatus 100 and the imaging apparatus 200 for correcting a tilt relative to the horizontal direction of an image without an operation input as the embodiment of the present invention, but the embodiment of the present invention is not limited to the configuration. The embodiment of the present invention can correct a tilt relative to the vertical direction of an image without an operation input through the processing (1) (approximate straight line derivation processing based on trajectory by operation input), the processing (2) (image tilt correction processing) and the processing (3) (following processing).

The above configuration is one example of the embodiment of the present invention and naturally falls within the technical scope of the present invention.

What is claimed is:

1. An image processing apparatus, comprising:
   an operation display unit configured to display an image on a display screen and capable of receiving an operation input on the image displayed on the display screen;
   an operation input detection unit configured to detect the operation input received by the operation display unit,
   wherein the operation input is formed by continuous movement of a respective object from a position corresponding to a first location on the display screen to another position corresponding to a further location on the display screen such that a distance from the first location on the display screen to the further location on the display screen exceeds a predetermined, non-zero fixed value;
   an approximated line derivation unit configured to derive a first approximated line based on the detection result in the operation input detection unit, to set a region of the image by use of the first approximated line in which the region is defined by two first lines parallel to the first approximated line and two second lines orthogonal to the first approximated line, and to cut out the region of the image; and
   an image correction unit for correcting a tilt of the image displayed on the display screen based on the cut out region by rotating a portion of the image corresponding to the cut out region,
   in which the first approximated line and each of the two first lines of the region are parallel to a line associated with the tilt of the image and wherein the tilt of the image represents an angle of the image relative to either a horizontal reference line or a vertical reference line.

2. The image processing apparatus according to claim 1, wherein when the distance from the first location on the display screen to the further location on the display screen does not exceed the predetermined fixed, non-zero value, the image processing apparatus terminates the correction of the tilt of the image.

3. An image processing method, comprising the steps of:
   displaying an image on a display screen and detecting an operation input in an operation display unit capable of receiving the operation input on the image displayed on the display screen,
   wherein the operation input is formed by continuous movement of a respective object from a position corresponding to a first location on the display screen to another position corresponding to a further location on the display screen such that a distance from the first location on the display screen to the further location on the display screen exceeds a predetermined, non-zero fixed value;

deriving a first approximated line based on a detection result in the detecting step;

setting a region of the image by use of the first approximated line in which the region is defined by two first lines parallel to the first approximated line and two second lines orthogonal to the first approximated line;

cutting out the region of the image and correcting a tilt of the image displayed on the display screen based on the cutout region by rotating a portion of the image corresponding to the cutout region, in which the first approximated line and each of the two first lines of the region are parallel to a line associated with the tilt of the image and wherein the tilt of the image represents an angle of the image relative to either a horizontal reference line or a vertical reference line.

4. The image processing method according to claim 3, wherein the image correction step corrects the tilt of the image by changing the tilt of the first approximated line.

5. The image processing method according to claim 4, wherein the image correction step estimates and complements regions other than the cutout region from images of the previous and subsequent frames.

6. The image processing method according to claim 3, wherein the operation input detection step detects, from the operation input received by the operation display unit, a plurality of display screen coordinates associated with a path of the respective object.

7. The image processing method according to claim 6, wherein the approximated line derivation step derives the first approximated line based on the detected plurality of display screen coordinates.

8. A processor encoded with a computer program for causing a computer to perform the steps of:

displaying an image on a display screen and detecting an operation input in an operation display unit capable of receiving the operation input on the image displayed on the display screen, wherein the operation input is formed by continuous movement of a respective object from a position corresponding to a first location on the display screen to another position corresponding to a further location on the display screen such that a distance from the first location on the display screen to the further location on the display screen exceeds a predetermined, non-zero fixed value;

deriving a first approximated line based on the detection result in the detection step;

setting a region of the image by use of the first approximated line in which the region is defined by two first lines parallel to the first approximated line and two second lines orthogonal to the first approximated line;

cutting out the region of the image; and correcting a tilt of the image displayed on the display screen based on the cutout region by rotating a portion of the image corresponding to the cutout region, in which the first approximated line and each of the two first lines of the region are parallel to a line associated with the tilt of the image and wherein the tilt of the image represents an angle of the image relative to either a horizontal reference line or a vertical reference line.

9. An imaging apparatus, comprising:

an imaging unit configured to image a photographic subject and to generate a photographed image;

an operation display unit configured to display the photographed image imaged by the imaging unit on a display screen and to receive an operation input on the photographed image displayed on the display screen;

an operation input detection unit configured to detect the operation input received by the operation display unit, wherein the operation input is formed by continuous movement of a respective object from a position corresponding to a first location on the display screen to another position corresponding to a further location on the display screen such that a distance from the first location on the display screen to the further location on the display screen exceeds a predetermined, non-zero fixed value;

an approximated line derivation unit configured to derive a first approximated line based on the detection result in the operation input detection unit, to set a region of the image by use of the first approximated line in which the region is defined by two first lines parallel to the first approximated line and two second lines orthogonal to the first approximated line, and to cut out the region of the image based on the first approximated line;

an image correction unit configured to correct a tilt of the photographed image displayed on the display screen based on the cutout region by rotating a portion of the image corresponding to the cutout region; and an image recording unit for recording a corrected image in a recording medium, in which the first approximated line and each of the two first lines of the region are parallel to a line associated with the tilt of the image and wherein the tilt of the image represents an angle of the image relative to either a horizontal reference line or a vertical reference line.

* * * * *